US011754745B2

(12) United States Patent
Kayum et al.

(10) Patent No.: US 11,754,745 B2
(45) Date of Patent: Sep. 12, 2023

(54) METHODS AND SYSTEMS FOR FLOW-BASED COARSENING OF RESERVOIR GRID MODELS

(71) Applicant: SAUDI ARABIAN OIL COMPANY, Dhahran (SA)

(72) Inventors: Suha Naim Kayum, Dhahran (SA); Marcin Rogowski, Dhahran (SA); Michel Cancelliere, Dhahran (SA); Paul Crumpton, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 538 days.

(21) Appl. No.: 16/916,978

(22) Filed: Jun. 30, 2020

(65) Prior Publication Data

US 2021/0405249 A1    Dec. 30, 2021

(51) Int. Cl.
*G01V 99/00* (2009.01)
*G06F 30/23* (2020.01)
(Continued)

(52) U.S. Cl.
CPC ............ *G01V 99/005* (2013.01); *G06F 30/23* (2020.01); *G06F 30/28* (2020.01); *G06T 5/002* (2013.01);
(Continued)

(58) Field of Classification Search
CPC ....... G01V 99/005; G06F 30/23; G06F 30/28; G06F 2113/08; G06T 5/002;
(Continued)

(56) References Cited

U.S. PATENT DOCUMENTS

| 6,106,561 A | 8/2000 | Farmer |
| 7,716,029 B2 | 5/2010 | Couet et al. |

(Continued)

FOREIGN PATENT DOCUMENTS

| CN | 102184532 A | 9/2011 |
| CN | 103902751 A | 7/2014 |

(Continued)

OTHER PUBLICATIONS

M. Charina, et al., "Multigrid methods: Grid transfer operators and subdivision schemes," Linear Algebra and its Applications 520 pp. 151-190 (Year: 2017).*

(Continued)

*Primary Examiner* — Steven W Crabb
(74) *Attorney, Agent, or Firm* — Osha Bergman Watanabe & Burton LLP

(57) ABSTRACT

A method may include obtaining model data for a reservoir region of interest. The model data may include flow property data based on streamlines. The method may further include generating a multilevel coarsening mask describing various coarsening levels that correspond to different flow values among the flow property data. The method may further include generating a coarsened grid model using the model data and the multilevel coarsening mask. The method may further include performing a reservoir simulation of the reservoir region of interest using the coarsened grid model.

12 Claims, 25 Drawing Sheets

(51) Int. Cl.
G06F 30/28 (2020.01)
G06T 5/00 (2006.01)
G06T 17/20 (2006.01)
G06F 113/08 (2020.01)

(52) U.S. Cl.
CPC ........ *G06T 17/205* (2013.01); *G06F 2113/08* (2020.01); *G06T 2207/20016* (2013.01)

(58) Field of Classification Search
CPC ......... G06T 17/205; G06T 2207/20016; E21B 43/00; E21B 49/00; E21B 2200/20
See application file for complete search history.

(56) References Cited

U.S. PATENT DOCUMENTS

| | | | |
|---|---|---|---|
| 8,078,437 | B2 | 12/2011 | Wu et al. |
| 8,131,526 | B2 | 3/2012 | Neville |
| 8,339,396 | B2 | 12/2012 | Williams et al. |
| 8,346,523 | B2 | 1/2013 | Lee et al. |
| 8,350,851 | B2 | 1/2013 | Flew et al. |
| 8,646,525 | B2 | 2/2014 | Izgec et al. |
| 8,650,016 | B2 | 2/2014 | Lunati et al. |
| 8,718,993 | B2 | 5/2014 | Klie |
| 9,058,445 | B2 | 6/2015 | Usadi et al. |
| 9,187,984 | B2 | 11/2015 | Usadi et al. |
| 9,690,885 | B2 | 6/2017 | Walsh et al. |
| 9,753,181 | B2 | 9/2017 | Gorell et al. |
| 10,260,317 | B2 | 4/2019 | Abacioglu et al. |
| 2008/0167849 | A1 | 7/2008 | Hales et al. |
| 2010/0312535 | A1 | 12/2010 | Chen et al. |
| 2012/0179443 | A1 | 7/2012 | Van Batenburg et al. |
| 2012/0221302 | A1 | 8/2012 | Lewandowski et al. |
| 2012/0275658 | A1 | 11/2012 | Hurley et al. |
| 2015/0323701 | A1 | 11/2015 | Mesri et al. |
| 2016/0319627 | A1 | 11/2016 | Blekhman et al. |
| 2016/0342718 | A1 | 11/2016 | Moyner et al. |
| 2018/0196162 | A1 | 7/2018 | Fung et al. |
| 2018/0232950 | A1 | 8/2018 | Brewer et al. |
| 2018/0320493 | A1 | 11/2018 | Ramsay et al. |
| 2020/0202056 | A1* | 6/2020 | Samson ................. G01V 1/307 |

FOREIGN PATENT DOCUMENTS

| | | |
|---|---|---|
| CN | 105808793 A | 7/2016 |
| CN | 107060746 A | 8/2017 |
| EP | 3671290 A1 | 6/2020 |
| GB | 2519630 A | 4/2015 |
| WO | 2017151100 A1 | 9/2017 |
| WO | 2018201117 A1 | 11/2018 |

OTHER PUBLICATIONS

K. A. Lie, et al., "A General Non-Uniform Coarsening and Upscaling Framework for Reduced-Order Modeling," SPE-182681-MS p. 1-17 (Year: 2017).*

Lie, K.-A., et al., "A General Non-Uniform Coarsening and Upscaling Framework for Reduced-Order Modeling", SPE-182681-MS, Society of Petroleum Engineers, Feb. 2017 (17 pages).

King, Michael J. et al., "Optimal Coarsening of 3D Reservoir Models for Flow Simulation", SPE 95759, SPE Reservoir Evaluation & Engineering, Aug. 2006, pp. 317-334 (18 pages).

Durlofsky, L.J. et al., "Scale Up of Heterogeneous Three Dimensional Reservoir Descriptions", SPE 30709, SPE Journal, Society of Petroleum Engineers, Inc., presented Oct. 1995, published Sep. 1996 (14 pages).

Ding, Yu and P.A. Lemonnier, "Development of Dynamic Local Grid Refinement in Reservoir Simulation", SPE 25279, Society of Petroleum Engineers, Inc., Feb. 1993 (10 pages).

Zhang, Yanbin, "Dynamic Reservoir Characterization Using Complex Grids Based on Streamline and Fast Marching Methods", A Dissertation, Office of Graduate Studies, Texas A&M University, Aug. 2013 (171 pages).

Stüben, Klaus, "Solving Reservoir Simulation Equations", 9th International Forum on Reservoir Simulation, Abu Dhabi, UAE, Dec. 9-13, 2007 (53 pages).

Suk, Tomás et al., "Rectangular Decomposition of Binary Images", Eds. J. Blanc-Talon et al., Institute of Information Theory and Automation of the ASCR, Spring-Verlag Berlin Heidelberg, 2012, pp. 213-224 (12 pages).

Durlofsky, Louis J., "Upscaling and Gridding of Fine Scale Geological Models for Flow Simulation", Department of Petroleum Engineering, Stanford Universtiy, 8th International Forum on Reservoir Simulation, Jun. 2005 (59 pages).

Subr, Kartic et al., "Greedy Algorithm for Local Contrast Enhancement of Images", School of Information and Computer Science, Univeristy of California, Sep. 2005 (8 pages).

Hörster, E. and R. Lienhart, "On the Optimal Placement of Multiple Visual Sensors", VSSN'06, Multimedia Computing Lab, University of Augsburg, Oct. 2006, pp. 111-120 (10 pages).

Tran, Thomas T. et al., "Efficient Conditioning of 3D Fine-Scale Reservoir Model To Multiphase Production Data Using Streamline-Based Coarse-Scale Inversion and Geostatistical Downscaling", SPE 56518, Society of Petroleum Engineers Inc., Oct. 1999 (13 pages).

Durlofsky, L.J. et al., "Application of a New Scale Up Methodology to the Simulation of Displacement Processes in Heterogeneous Reservoirs", SPE 28704, Society of Petroleum Engineers, Inc., 1996 (13 pages).

Portella, R.C.M. and T.A. Hewett, "Upscaling, Gridding, and Simulating Using Streamtubes", SPE 65684, SPE Journal 5, vol. 3, Society of Petroleum Engineers, Sep. 2000, pp. 315-323 (9 pages).

Samier, P. et al., "Applications of Streamline Simulations to Reservoir Studies", SPE 78883, SPE Reservoir Evaluation & Engineering, Society of Petroleum Engineers, Aug. 2002, pp. 324-332 (9 pages).

Chawathé, Adwait and Ian Taggart, "Insights Into Upscaling Using 3D Streamlines", SPE 88846, SPE Reservoir Evaluation & Engineering, Society of Petroleum Engineers, Aug. 2004, pp. 285-296 (12 pages).

Fanjul, Javier Prieto and Mario Gustavo Vicente, "Reservoir Connectivity Evaluation and Upscaled Model Screening Using Streamline Simulation", SPE 164312, Society of Petroleum Engineers, Mar. 2013 (22 pages).

Hauge, Vera Louise et al., "Flow-based coarsening for multiscale simulation of transport in porous media", Comput Geosci, vol. 16, Springer Science+Business Media B.V., Mar. 2011, pp. 391-408 (18 pages).

Taware, Satyajit et al., "A Practical Approach for Assisted History Matching Using Grid Coarsening and Streamline-Based Inversion: Experiences in a Giant Carbonate Reservoir", SPE 141606, Society of Petroleum Engineers, Feb. 2011 (16 pages).

Aarnes, Jørg Espen et al., "Coarsening of three-dimensional structured and unstructured grids for subsurface flow", Elsevier Science, Apr. 2007 (28 pages).

International Search Report issued in corresponding International Application No. PCT/US2020/049365, dated Nov. 30, 2020 (3 pages).

Written Opinion issued in corresponding International Application No. PCT/US2020/049365, dated Nov. 30, 2020 (6 pages).

Gielisse R A M: "Dynamic Local Grid Refine-ment for Incomplete Mixing in Reservoir Sim-ulation", Jun. 30, 2016, pp. 1-119; XP055783204; Retrieved from the Internet: URL: https://repository.tudelft.nl/islandora/object/uuid%3Abe183b49-275e-4747-be20-f937a3c24f78 (119 pages).

Alexandre Castellini: "Flow Based Grids for Reservoir Simulation", Jun. 1, 2001; XP055394074; Retrieved from the Internet: URL: http://sul-derivatives.stanford.edu/derivative? CSNID=00018084&mediaType=application/pdf (90 pages).

International Search Report and Written Opinion issued in Application No. PCT/US2020/046631, dated Mar. 17, 2021 (18 pages).

Non-Final Office Action issued in related U.S. Appl. No. 16/916,928, dated Jul. 18, 2022 (44 pages).

Thomas, Sunil, Song Du, Gaelle Dufour, Brad Mallison, Pierre Muran, and Alvaro Rey. "Recent Developments in Unstructured Aggregation-Based Upscaling for Simulation Workflows and Appli-

(56) References Cited

OTHER PUBLICATIONS cations." (OnePetro, 2019). Society of Petroleum Engineers: SPE-193881-MS. pp. 1-19 (Year: 2019).

Chung, Traiwit, Ying Da Wang, Ryan T. Armstrong, and Peyman Mostaghimi. "Voxel agglomeration for accelerated estimation of permeability from micro-CT images." (Elsevier, 2019) Journal of Petroleum Science and Engineering 184: 106577. https://doi.org/10.1016/j.petrol.2019.106577 (Year: 2019).

Salazar, Melvin Oswaldo, and Jose Reinaldo Villa Piamo. "Permeability upscaling techniques for reservoir simulation." (OnePetro, 2007) Society of Petroleum Engineers: SPE 106679. pp. 1-17 (Year: 2007).

Cordazzo, Jonas, Leonardo Karpinski, Susie Keller, Antonio FC Silva, and Clovis R. Maliska. "Additive Correction Multigrid Applied to Petroleum Reservoir Simulation." (ResearchGate, 2007). CMNE/CILAMCE 2007 Porto, Jun. 13-15, 2007; APMTAC, Portugal 2007; (Year: 2007).

Gerritsen, M., and J. V. Lambers. "Integration of local-global upscaling and grid adaptivity for simulation of subsurface flow in heterogeneous formations." (Springer, 2008) Computational Geosciences 12, No. 2: 193-208. DOI 10.1007/s10596-007-9078-2 (Year: 2008).

Dogru, Ali H., Larry Siu Kuen Fung, Usuf Middya, Tareq Al-Shaalan, and Jorge Alberto Pita. "A next-generation parallel reservoir simulator for giant reservoirs." (OnePetro, 2009) Society of Petroleum Engineers: SPE 119272. pp. 1-29 (Year: 2009).

Final Office Action issued in corresponding U.S. Appl. No. 16/916,928, dated Jan. 9, 2023 (31 pages).

Breitfelder, Kim et al., "IEEE 100: The Authoritative Dictionary of IEEE Standards Terms"; Standards Information Network IEEE Press; Seventh Edition; p. 435; ISBN 0-7381-2601-2; 2000 (3 pages).

\* cited by examiner

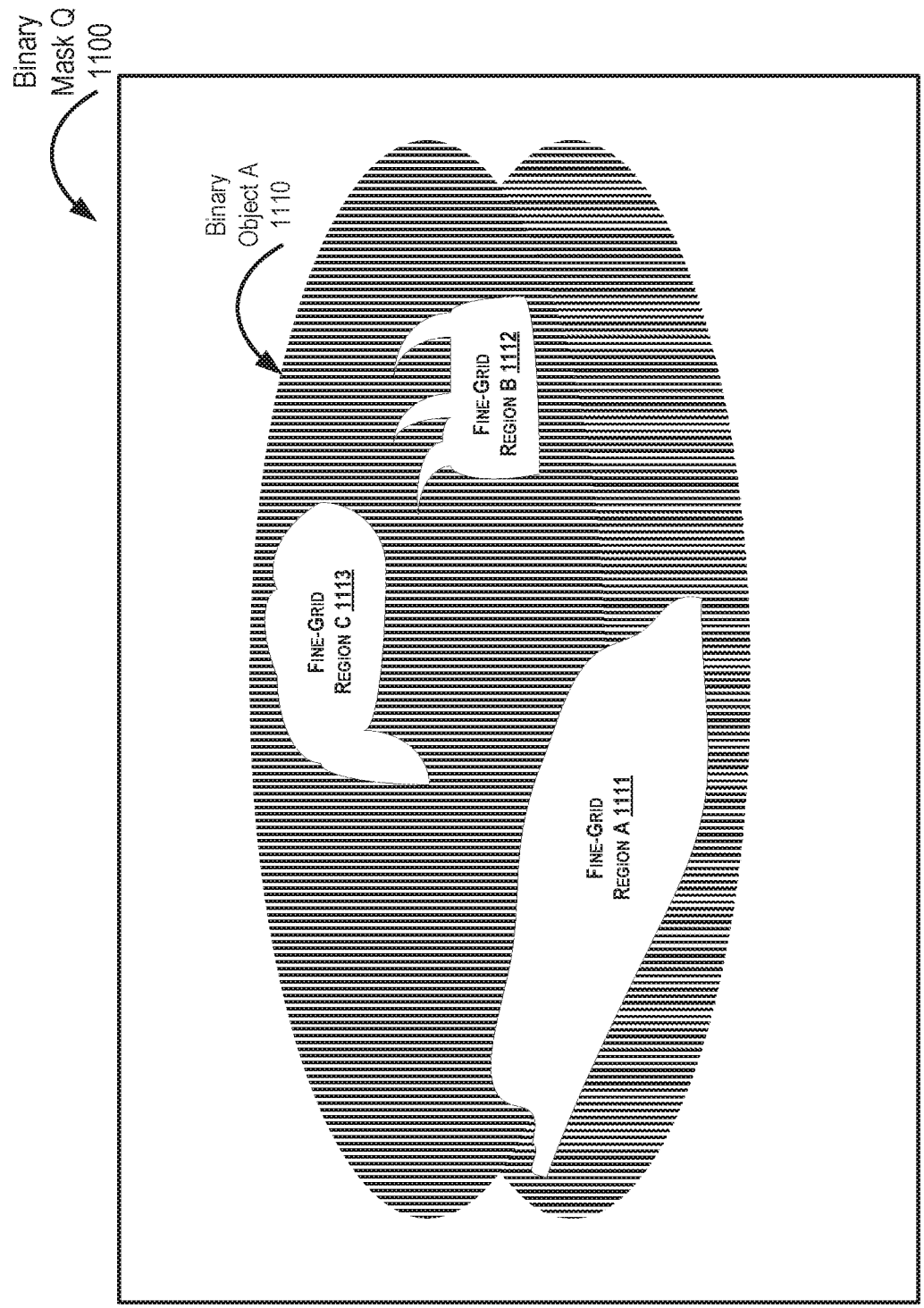

FIG. 14B

METHODS AND SYSTEMS FOR FLOW-BASED COARSENING OF RESERVOIR GRID MODELS

BACKGROUND

In a coarsened model, properties for various cells may be averaged in a process called up scaling. However, if not applied properly upscaling may provide a solution in the coarsened model that may lose accuracy as the details are lost in the averaging process, especially where coarsening is applied to highly influential grid-cells. Thus, accurate simulations may require a coarsened model that reduces the computational time to a reasonable speed while also preserving relevant physical relationships in the underlying data.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, model data for a reservoir region of interest. The model data includes flow property data based on streamlines. The method further includes generating, by the computer processor, a multilevel coarsening mask describing various coarsening levels that correspond to different flow values among the flow property data. The method further includes generating, by the computer processor, a coarsened grid model using the model data and the multilevel coarsening mask. The method further includes performing, by the computer processor, a reservoir simulation of the reservoir region of interest using the coarsened grid model.

In general, in one aspect, embodiments relate to a computer system that includes a processor and a memory coupled to the processor. The memory includes functionality for obtaining model data for a reservoir region of interest. The model data includes flow property data based on streamlines. The memory further includes functionality for generating a multilevel coarsening mask describing various coarsening levels that correspond to different flow values among the flow property data. The memory further includes functionality for generating a coarsened grid model using the model data and the multilevel coarsening mask. The memory further includes functionality for performing a reservoir simulation of the reservoir region of interest using the coarsened grid model.

In general, in one aspect, embodiments relate to non-transitory computer readable medium storing instructions executable by a computer processor. The instructions obtain model data for a reservoir region of interest. The model data includes flow property data based on streamlines. The instructions further generate a multilevel coarsening mask describing various coarsening levels that correspond to different flow values among the flow property data. The instructions further generate a coarsened grid model using the model data and the multilevel coarsening mask. The instructions further perform a reservoir simulation of the reservoir region of interest using the coarsened grid model.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 10, 11A, and 11B show examples in accordance with one or more embodiments.

FIGS. 13A, 13B, 14A, 14B, and 14C show examples in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using various algorithms to coarsen a fine-grid model to increase performance of a reservoir simulator. For example, some embodiments are directed to using image processing techniques preserve flow properties of a reservoir region. In some embodiments, streamline simulations provide the framework for generating an underlying coarsening mask. Likewise, some embodiments use decomposition algorithms or combinatorial algorithms to further mitigate various burdens on a reservoir simulator to produce a coarsened grid model.

Figure 1:
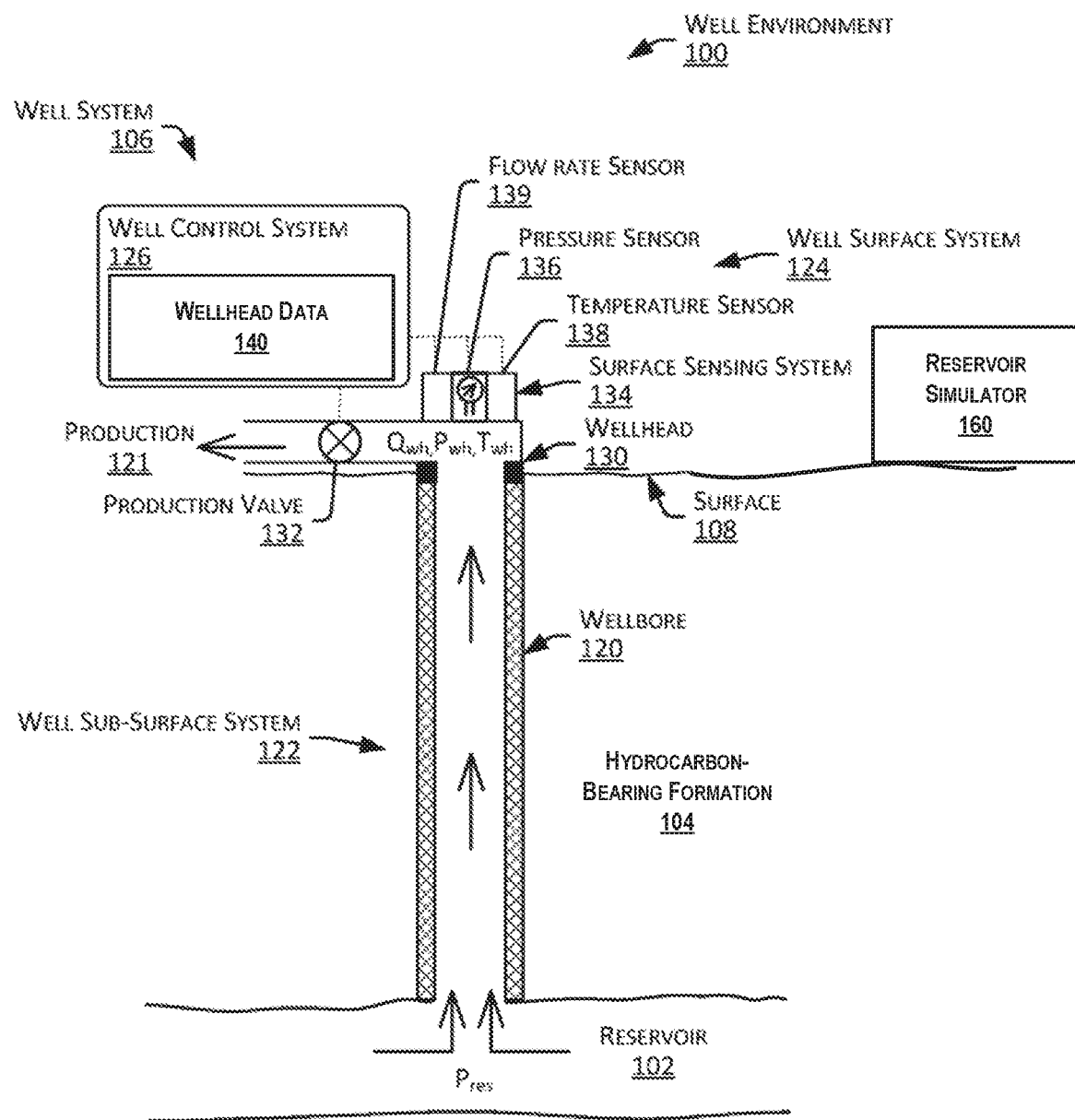
FIGS. 1, 2A, 2B, 3, and 4 show systems in accordance with one or more embodiments.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computing system (1700) described below in FIG. 17 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) ($Q_{wh}$) passing through the wellhead (130).

In some embodiments, the well system (106) includes a reservoir simulator (160). For example, the reservoir simulator (160) may include hardware and/or software with functionality for generating one or more reservoir models regarding the hydrocarbon-bearing formation (104) and/or performing one or more reservoir simulations. For example, the reservoir simulator (160) may store well logs and data regarding core samples for performing simulations. A reservoir simulator may further analyze the well log data, the core sample data, seismic data, and/or other types of data to generate and/or update the one or more reservoir models. While the reservoir simulator (160) is shown at a well site, embodiments are contemplated where reservoir simulators are located away from well sites. In some embodiments, the reservoir simulator (160) may include a computer system that is similar to the computing system (1700) described below with regard to FIG. 17 and the accompanying description.

Figure 2A:
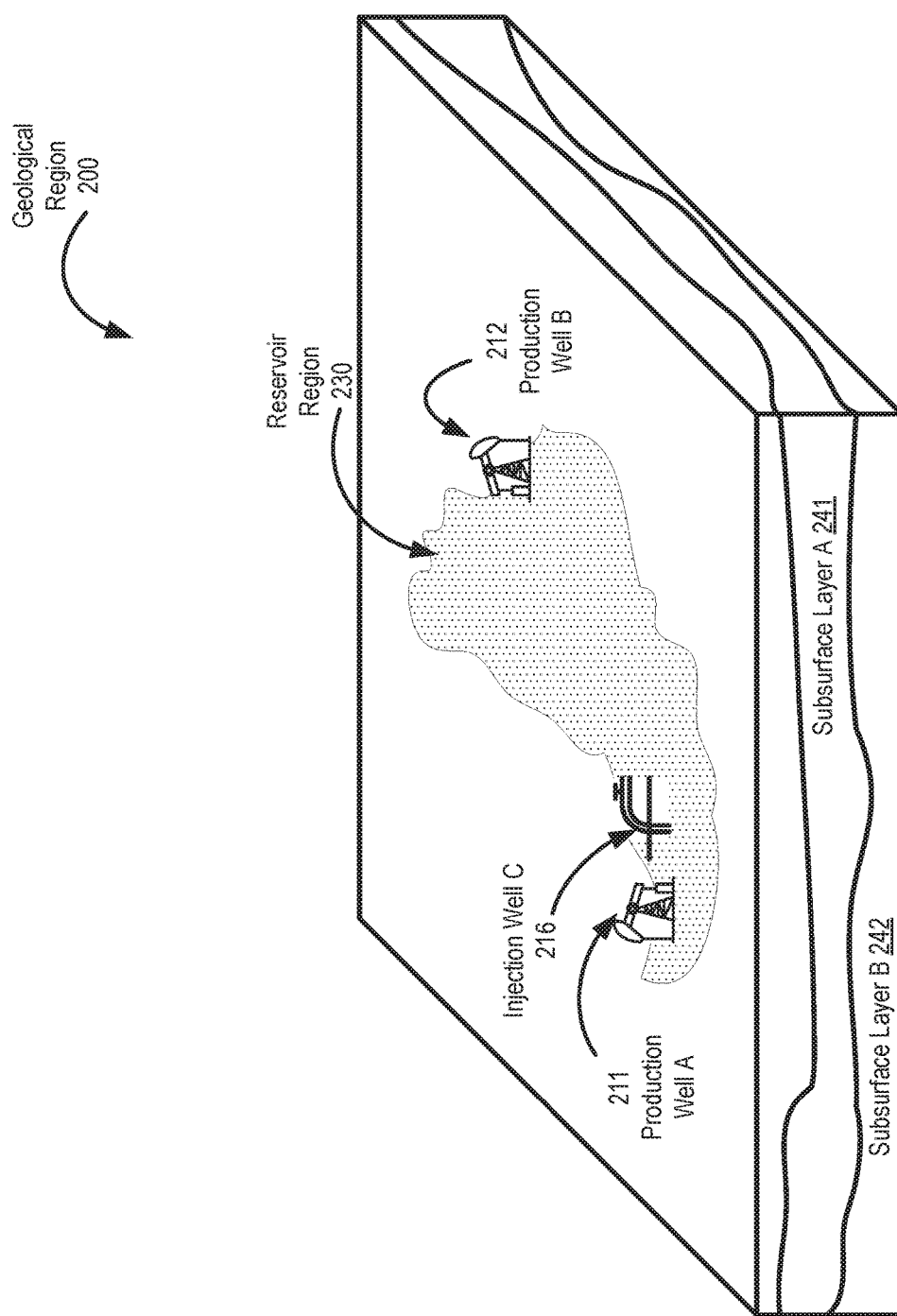

Turning to FIG. 2A, FIG. 2A shows a schematic diagram in accordance with one or more embodiments. As illustrated in FIG. 2A, FIG. 2A shows a geological region (200) that may include one or more reservoir regions (e.g., reservoir region (230)) with various production wells (e.g., production well A (211), production well (212)). For example, a production well may be similar to the well system (106) described above in FIG. 1 and the accompanying description. Likewise, a reservoir region may also include one or more injection wells (e.g., injection well C (216)) that include functionality for enhancing production by one or more neighboring production wells. As shown in FIG. 2A, wells may be disposed in the reservoir region (230) above various subsurface layers (e.g., subsurface layer A (241), subsurface layer B (242)), which may include hydrocarbon deposits. In particular, production data and/or injection data may exist for a particular well, where production data may include data that describes production or production operations at a well, such as wellhead data (142) described in FIG. 1 and the accompanying description.

Figure 2B:
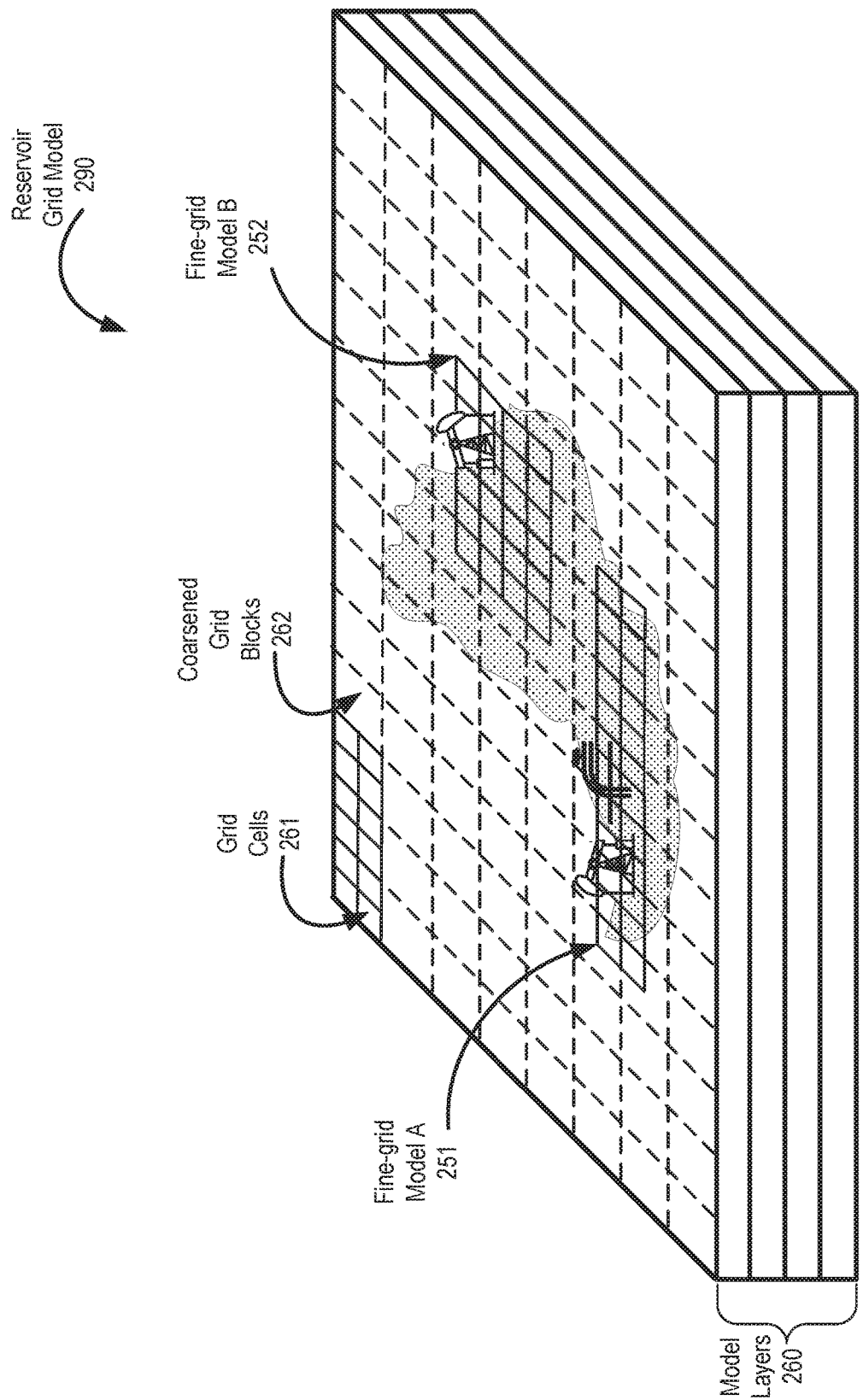

Turning to FIG. 2B, FIG. 2B shows a schematic diagram in accordance with one or more embodiments. As illustrated in FIG. 2B, FIG. 2B shows a reservoir grid model (290) that corresponds to the geological region (200) from FIG. 2A. More specifically, the reservoir grid model (290) includes grid cells (261) that may refer to an original cell of a reservoir grid model as well as coarsened grid blocks (262) that may refer to an amalgamation of original cells of the reservoir grid model. For example, a grid cell may be the case of a 1×1 block, where coarsened grid blocks may be of sizes 2×2, 4×4, 8×8, etc. Both the grid cells (261) and the coarsened grid blocks (262) may correspond to columns for multiple model layers (260) within the reservoir grid model (290).

Prior to performing a reservoir simulation, local grid refinement and coarsening (LGR) may be used to increase or decrease grid resolution in a certain area of reservoir grid model. For example, various reservoir properties, e.g., permeability, porosity or saturations, may correspond to a discrete value that is associated with a particular grid cell or coarsened grid block. However, by using discrete values to represent a portion of a geological region, a discretization error may occur in a reservoir simulation. Thus, finer grids may reduce discretization errors as the numerical approximation of a finer grid is closer to the exact solution, however through a higher computational cost. As shown in FIG. 2B, for example, the reservoir grid model (290) may include various fine-grid models (i.e., fine-grid model A (251), fine-grid model B (252)), that are surrounded by coarsened block regions. Likewise, the original reservoir grid model without any coarsening may also be a fine-grid model.

In some embodiments, proxy models or reduced-order models may be generated for performing a reservoir simulation. For example, one way to reduce model dimensionality is to reduce the number of grid blocks and/or grid cells. By averaging reservoir properties into larger blocks while preserving the flow properties of a reservoir model, computational time of a reservoir simulation may be reduced. In general, coarsening may be applied to cells that do not contribute to a total flow within a reservoir region because a slight change on such reservoir properties may not affect the output of a simulation. Accordingly, different levels of coarsening may be used on different regions of the same reservoir model. As such, a coarsening ratio may correspond to a measure of coarsening efficiency, which may be defined as a total number of cells in a coarsened reservoir model divided by the original number of cells in the original reservoir model.

In some embodiments, a reservoir grid model may be adjusted to reduce the load of an individual simulation run such as through cropping the original grid model and running the cropped models independently, dividing a grid model into sector models and running them independently, or coarsening and upscaling the original grid model. In cropped models, the original model is separated into smaller ones without retaining the flow properties at various boundaries within the model. By ignoring the flow properties and thus the interaction between the separated parts of the reservoirs, inaccuracies may be introduced into simulation runs with the cropped model. In sector modeling, the grid model may be divided into smaller models while storing the flow properties on various boundaries over time, but using boundary flux may be a time consuming task. If there are significant changes in the grid model outside the area of interest the flow properties may be updated through a simulation of a fine-grid model. Flow properties, such as flux, may be defined as a reservoir fluid (e.g., oil or water) that flows between any two grid blocks. Likewise, grid cells or blocks may be upscaled in a method that reduces the computational demand on running simulations using fewer grid cells. However, a grid model may lose accuracy in a reservoir simulation if the underlying properties differ too much from the original fine-grid model.

Figure 3:
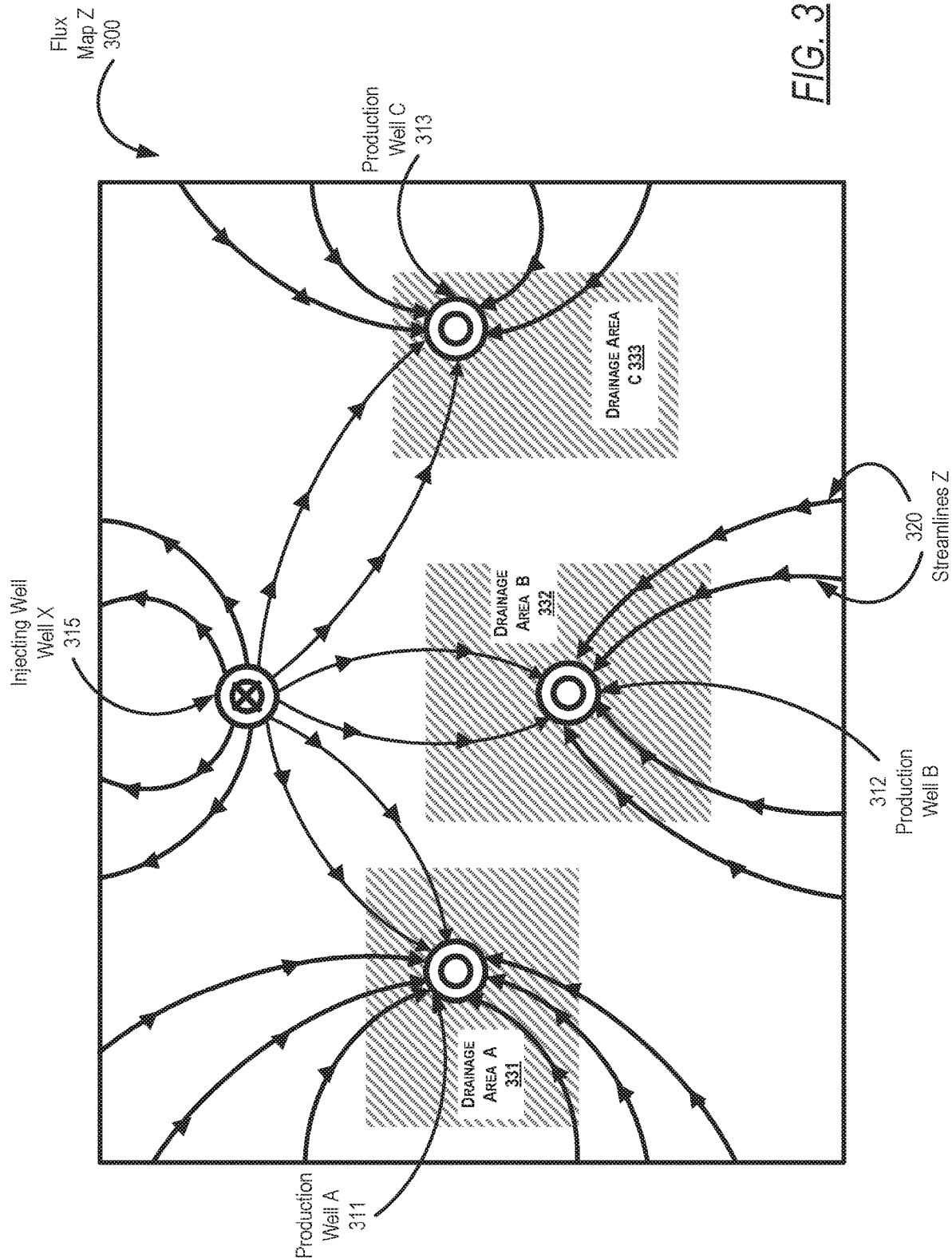

Turning to FIG. 3, FIG. 3 shows a schematic diagram in accordance with one or more embodiments. In FIG. 3, a flux map (e.g., flux map Z (300)) describes various flow properties between various productions wells (i.e., production well A (311), production well B (312), production well C (313)) and an injection well (injection well X (315)) within a reservoir region. For example, the flux map Z (300) includes various streamlines (e.g., streamlines Z (320)) that may be generated during one or more reservoir simulations of the reservoir region. In particular, streamlines may be field lines instantaneously tangent to a fluid velocity field that provide a representation of reservoir connectivity. As such, streamlines may be an alternative to cell-based grid modeling techniques in reservoir simulations, where a streamline output from a reservoir simulator may include a snapshot of an instantaneous flow field in a geological region. Streamlines may be beneficial in understanding the boundaries of one or more well drainage volumes (e.g., a drainage volume may correspond to drainage area A (331), drainage area B (332), and/or drainage area C (333)) in a reservoir region. Likewise, individual streamlines may describe flow properties of a production well (e.g., production well A (311), production well B (312), production well C (313)) or an injection well (e.g., injection well X (315)).

In some embodiments, a reservoir simulator may transform a reservoir grid model into a number of flow paths of nominally constant flux similar to the flux map Z (300) shown in FIG. 3. While flow paths may be three-dimensional, the flow paths may be solved independently as essentially one-dimensional problems. Since a streamline may operate independently of other streamlines in the reservoir region, streamlines may be treated as a quasi-orthogonal basis set that describes a total flow of injected fluids into a flow path. Thus, streamline simulations may provide reservoir engineering information, such as the identification of waterflood patterns, well pair connections between injection wells and production wells, and areas of flood inefficiency. By calculating interwell multiphase fluxes using streamlines, for example, streamline simulations may identify how much oil production comes from the pressure support from a certain injection well. With this streamline information, injection rates and/or production rates may be adjusted in order to reduce water cycling, increase oil recovery, and/or improve flood management. Likewise, using a reservoir grid model and pre-injection data, a forward solution of an impact of fluid injected along a streamline may be determined independently. The results may be mapped back onto the original grid model to update fluid compositions as a function of time as well as indicate appropriate porosity and permeability changes in the underlying reservoir grid model.

Figure 4:
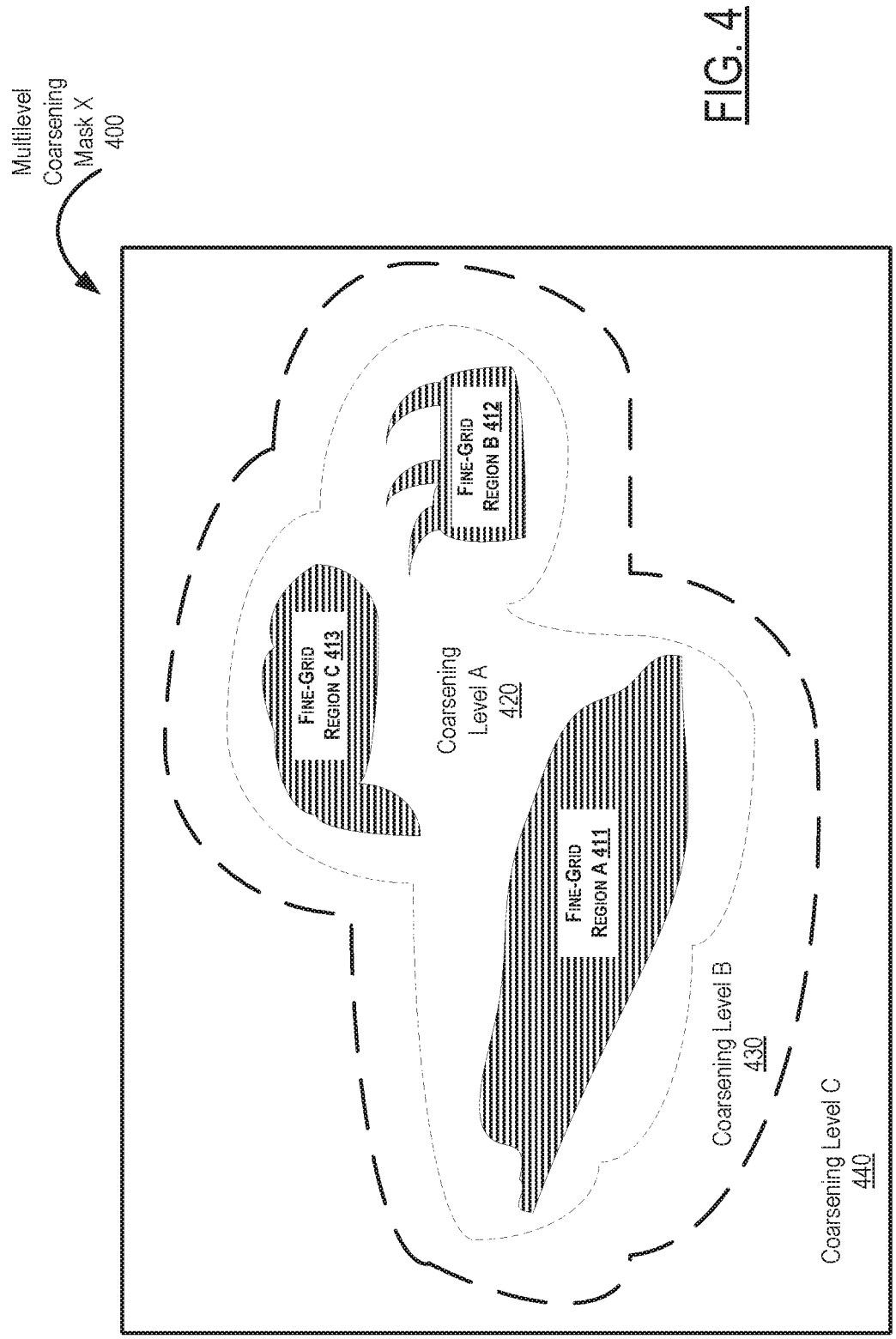

Turning to FIG. 4, FIG. 4 shows a schematic diagram in accordance with one or more embodiments. In FIG. 4, a multilevel coarsening mask (e.g., multilevel coarsening mask X (400)) describes various coarsening levels and/or refinement levels of a reservoir grid model. In some embodiments, a reservoir simulator uses a multilevel coarsening mask to label original cells in a reservoir grid model according to their respective coarsening or refinement levels for generating a particular coarsened grid model. In particular, these labels may correspond to various coarsening levels for original cells. In some embodiments, a multilevel coarsening mask is generated from multiple binary masks that specify areas where refinement or coarsening is desired in a reservoir grid model. In another embodiment, a multilevel coarsening mask may be separated into multiple binary masks that correspond to respective coarsening and/or refinement levels, e.g., to perform individual processing on cells within a respective coarsening level.

A binary mask may be an image or other dataset that is defined according to '1' and '0's, or any other binary integer set. For example, a '1' in a binary mask may correspond to a coarsening level of 8×8 cells for the respective coarsened grid block, while a '0' identifies a cell or block that is left unchanged during the coarsening process. For example, a binary mask may be obtained by a logical operator applied to a static or dynamic property, e.g. oil saturation, total flux, faults, facies, etc., within cells or blocks of a reservoir grid model. In some embodiments, coarsened grid blocks are squared with the side length of a coarsened grid block being a power of 2 (that is, 1, 2, 4, 8, etc.).

Keeping with FIG. 4, the multilevel coarsening mask X (400) includes various coarsening levels (i.e., coarsening level A (420), coarsening level B (430), and coarsening level C (440)) and various fine-grid regions (i.e., fine-grid region A (411), fine-grid region B (412), and fine-grid region C (413)). Where the fine-grid regions correspond to original cells in a reservoir grid model, coarsening level A (420) corresponds to coarsened grid blocks of a 2×2 size. Likewise, coarsening level B (430) and coarsening level C (440) correspond to coarsened grid blocks of a 4×4 size and an 8×8 size, respectively. Thus, the property resolution (490) of the multilevel coarsening mask Z (400) ranges from a fine-grid resolution that matches original grid cells to a maximum coarsening level at coarsening level C (440).

In some embodiments, a multilevel coarsening mask is generated using a coarsening/refinement algorithm. For example, a coarsening/refinement algorithm may define a series of LGR statements which identify one or more box-like cell regions within a reservoir grid model and an output number of grid blocks. For simplicity sake, an "LGR array" refers to the cells or blocks associated with an "LGR statement," e.g., cells or blocks within a coarsening mask, while an "LGR statement" refers to the computer instruction provided to a reservoir simulator for generating a coarsened grid model. Thus, a particular coarsened grid block in the coarsened grid model corresponds to the LGR array. In some embodiments, LGR statements may have a unique name identifier and a corresponding LGR definition. An example of an LGR statement is found below:

LGR_Array1 I1: 1, I2: 8, J1: 1, J2: 8, NI: 1, NJ: 1 where LGR_Array1 represents a unique identifier for the LGR statement and the following string of LGR_Array1 represents a respective LGR array of cells within a reservoir grid model, where I1 and I2 are the original LGR coordinates in the I-direction of a grid, J1 and J2 define the range in the J-direction of the grid. After defining the respective LGR array, NI and NJ define the block size of the respective LGR array in the resulting grid model. This LGR statement may produce a unique mapping between an output cell in the resulting grid model and the original grid model based on the unique identifier of the LGR statement. Automated tools in a reservoir simulator may produce small-sized "elementary" LGR statements which may result in a very large number of LGR statements (e.g., hundreds of thousands of LGR arrays for a coarsened grid model). LGR statements may be written to a computer program file and then read by a reservoir simulator during the re-gridding phase and as an input property for a reservoir simulation.

Figure 5:
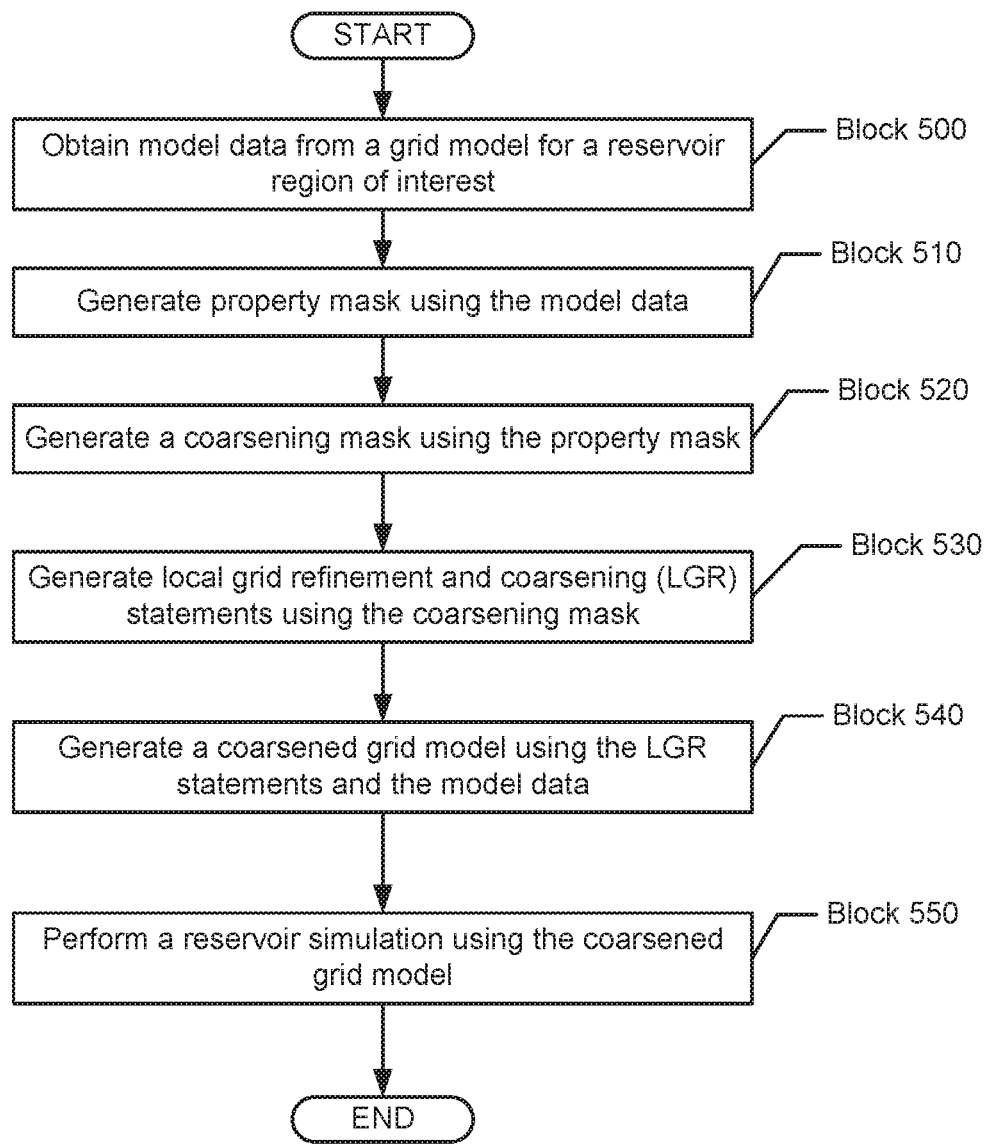
FIGS. 5 and 6 show flowcharts in accordance with one or more embodiments.

Turning to FIG. 5, FIG. 5 shows a flowchart in accordance with one or more embodiments. Specifically, FIG. 5 describes a general method for simulating a reservoir region of interest using a well assignment. One or more blocks in FIG. 5 may be performed by one or more components (e.g., reservoir simulator (160)) as described in FIGS. 1, 2B, and 4. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, model data is obtained from a grid model for a reservoir region of interest in accordance with one or more embodiments. For example, a reservoir simulator may access model data in a fine-grid model, where the model data includes various reservoir property values, such as oil saturation, water saturation, porosity, permeability, etc. The reservoir region of interest may correspond to a portion of a geological region selected for running simulations and further analysis. For example, the reservoir region of interest may be similar to geological region (200) or reservoir region (230) described above in FIG. 2A and the accompanying description.

In Block 510, a property mask is generated from model data in accordance with one or more embodiments. For example, a reservoir simulator may perform one or more logical operations on one or more selected reservoir properties within model data to generate a property mask. More specifically, the selected reservoir properties may be static grid properties coming from a reservoir grid model or dynamic grid properties coming from one or more previous reservoir simulations. Likewise, a property mask may include other features such as wells/perforations and fractures. In some embodiments, the property mask is obtained from streamlines and flow property information (e.g., time of flight). For more information on streamlines, see FIG. 3 above and the accompany description as well as the section below titled "System and Method for Flow-Based Coarsening of Reservoir Grid Models" below.

In some embodiments, this property mask may be obtained by imposing a predetermined threshold on one or more reservoir properties, e.g. oil saturation, total flux, fault activity, etc. Reservoir properties may be continuous and thus the output property mask using one or more predetermined thresholds may include irregular and patchy regions for coarsening/refinement. Where flow property information based on streamlines is the basis for a particular property mask, changes to the streamlines in different simulations may require different property masks or later updates to the property mask.

In Block 520, a coarsening mask is generated using a property mask in accordance with one or more embodiments. In particular, a coarsening mask may be a single level coarsening mask or a multilevel coarsening mask similar to the multilevel coarsening mask X (400) described above in FIG. 4 and the accompanying description. Likewise, one or more technologies may be implemented by a reservoir simulator to generate a coarsening mask. In some embodiment, for example, one or more image processing techniques may be used to transform a property mask into a coarsening mask, such as using the technologies described below in the section titled "Method for Refining and/or Coarsening a Grid Model using Image Processing Techniques."

In Block 530, various local grid refinement and coarsening (LGR) statements are generated using a coarsening mask in accordance with one or more embodiments. In particular, the LGR statements may refer to the LGR statements described above with respect to FIG. 4 and the accompanying description. In some embodiments, LGR object statements are generated using the coarsening mask in place of LGR statements or in addition to LGR statements. For more information on generating LGR object statements, see the section below titled "System and Method for Automatic Local Grid Refinement using Decomposition Algorithms on Coarsening Masks." In some embodiments, LGR statements and/or LGR object statements are generated using a predetermined coarsening scenario selected from multiple coarsening scenarios. For more information on selecting coarsening scenarios, see the section below titled "System and Method for Selecting Coarsening Scenarios for Reservoir Simulations."

In Block 540, a coarsened grid model is generated using LGR statements and model data in accordance with one or more embodiments. For more information on generating coarsened grid models, see FIGS. 2A, 2B, and 4 above and the accompanying description.

In Block 550, a reservoir simulation is performed using a coarsened grid model in accordance with one or more embodiments. For example, a reservoir simulator may use model data from the coarsened grid model as well as well data to solve well equations and reservoir equations. By using a coarsened grid model, a reservoir simulator may reduce the total computation time for performing various simulations.

In some embodiments, reservoir simulations may include various types of reservoir studies, e.g. history matching and field development and optimization. For example, different types of reservoir simulations may use different input parameters that may result in changes to the reservoir grid model data, such as by changing flow patterns and streamlines.

System and Method for Refining and/or Coarsening a Grid Model Using Image Processing Techniques In general, embodiments of the disclosure include systems and methods that use various image processing techniques to adjust the coarsening and/or refinement levels within a reservoir grid model. In some embodiments, for example, a reservoir simulator applies various image filters to expand and smooth different regions within a property mask. As such, matrix-matrix convolutions may be used to adjust different regions within a property mask to capture underlying reservoir processes. By using image processing techniques, the computational time is reduced for performing reservoir simulations, while also maintaining accuracy during the reservoir simulations.

In particular, various image processing techniques may be based on implementing a convolution kernel with respect to a property mask based on model data. The convolutional kernel may be a small matrix (e.g., the size of the matrix may depend on a desired imaging effect) that is successively applied to data within the property mask. A general convolution equation may be expressed by the following equation:

$$g(x, y) = \omega * f(x, y) = \sum_{s=-a}^{a} \sum_{t=-b}^{b} \omega(s, t) f(x-s, y-t), \quad \text{Equation 1}$$

where g(x, y) is the filtered image, f(x, y) is the original image, and ω is the filter kernel. Every element of the filter kernel may be considered by $-a \leq s \leq a$ and $-b \leq t \leq b$.

Furthermore, some embodiments are directed to preserving the original model grid in an area bigger than grid regions initially specified for coarsening within the property mask. For example, a reservoir simulator may automatically detect a number of disconnected regions within a mask and subsequently reduce the number of disconnected regions to a desired number through expansion of the regions. By doing so, the reservoir simulator may increase connectivity and minimize sparsity within the resulting coarsened grid model. After generating an expanded property mask, smoothing operations and lookup operations may be performed on the expanded property mask to generate a final property mask. In the final property mask, cell property values may be discretized to various coarsening levels and refinement levels. This final property mask may then be used to produce a coarsening mask as well as LGR statements for generating a coarsening mask.

Figure 6:
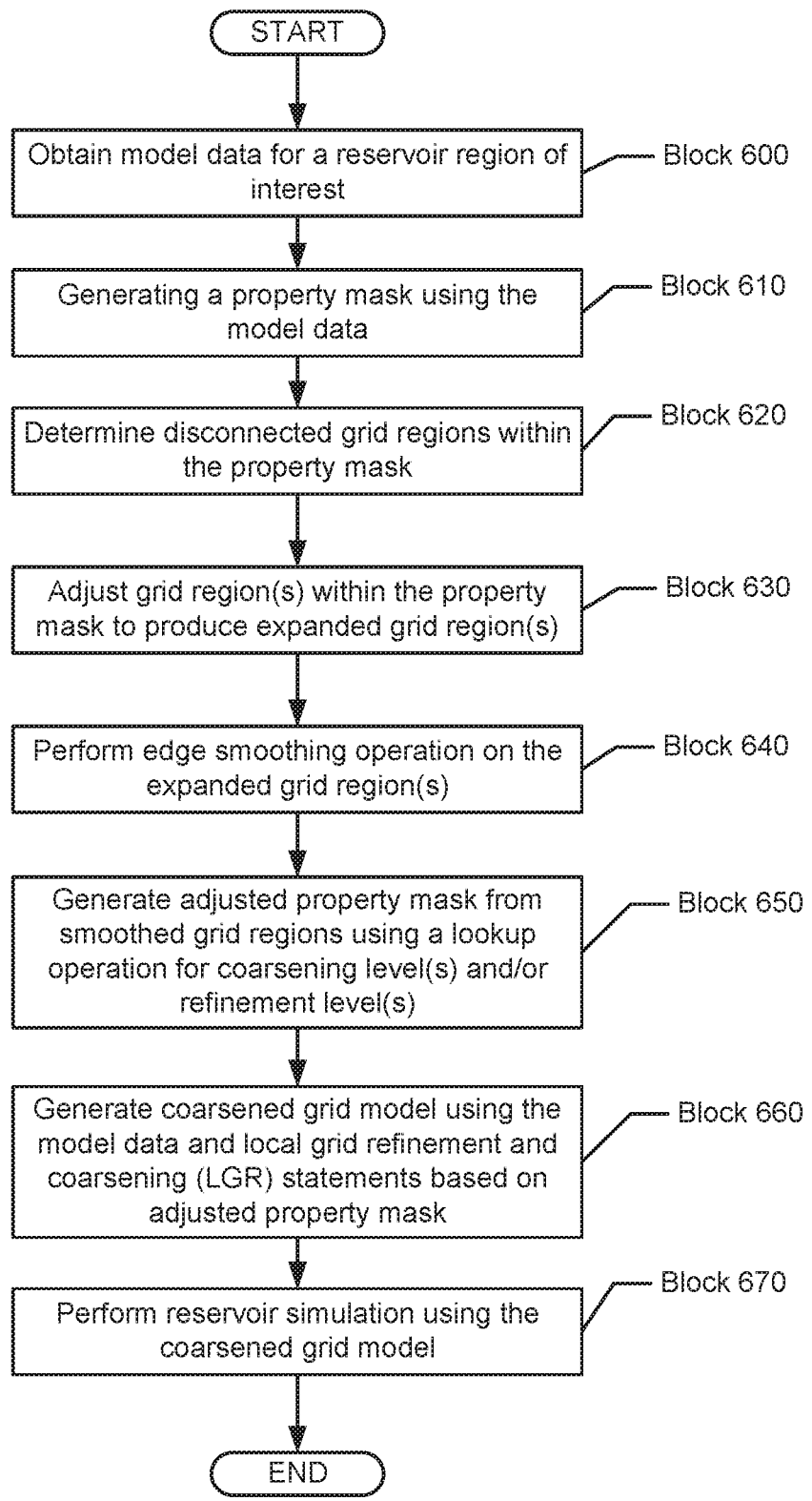

Turning to FIG. 6, FIG. 6 shows a flowchart in accordance with one or more embodiments. Specifically, FIG. 6 describes a specific method for simulating a reservoir region of interest using an adjusted property mask based on image processing techniques. One or more blocks in FIG. 6 may be performed by one or more components (e.g., reservoir simulator (160)) as described in FIGS. 1, 2B, and 4. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 600, model data is obtained for a reservoir region of interest in accordance with one or more embodiments. Block 600 may be similar to Block 500 described above in FIG. 5 and the accompanying description.

In Block 610, a property mask is generated using model data in accordance with one or more embodiments. Block 610 may be similar to Block 510 described above in FIG. 5 and the accompanying description.

In Block 620, disconnected grid regions are determined within a property mask in accordance with one or more embodiments. For example, when a property mask is generated using a threshold for a reservoir property value, some cells above the threshold may be surrounded by adjacent cells below the threshold. From a visual perspective, these disconnected regions may appear as various amounts of patchiness throughout the property mask (see, e.g., FIG. 8A below for an example). However, many cells below the threshold and proximate these disconnected regions may affect the accuracy of a reservoir simulation if unduly coarsened. As such, a reservoir simulator may calculate the total number of disconnected grid regions within the property mask to analyze and/or adjust the property mask.

In Block 630, one or more grid regions are adjusted within a property mask to produce expanded grid regions in accordance with one or more embodiments. In order to maintain accuracy with changing property conditions, grid regions in an initial property mask may be expanded to generate a safe zone around the grid regions and remove noise from the property mask. In some embodiments, grid region expansion may be performed using one or more image filters. For example, an image filter may be applied to a property mask using matrix-matrix convolution to produce an adjusted property mask to expand one or more grid regions. In other words, the disconnected grid regions in Block 620 may be increased in size to include relevant adjacent cells using the image filter.

In some embodiments, a reservoir simulator uses a normalized blur filter on a property mask. In particular, the normalized blur filter may correspond to a general N×N matrix. For example, a 3×3 normalized box blur filter $\omega_{BB}$ may be used to produce a grid region expansion, where the normalized box blur filter may be expressed by the following equation:

$$\omega_{BB} = \frac{1}{9}\begin{pmatrix} 1 & 1 & 1 \\ 1 & 1 & 1 \\ 1 & 1 & 1 \end{pmatrix} \qquad \text{Equation 2}$$

Furthermore, this normalized box blur filter may perform an expansion operation that replaces each cell within a property mask by an average of the surrounding kernel cells. The kernel size of the filter may be a matrix of NB×NB, where NB is a predetermined value selected by a user or automatically determined by a reservoir simulator. The resulting adjusted property mask may have values that range between 0 and 1. As such, a binary operator may be applied subsequently to the adjusted property mask to output a binary mask for further processing.

In some embodiments, a kernel size of a box blur filter may be adjusted automatically based on the number of disconnected regions in the property mask. For example, where the initial property mask has a total of 16 disconnected grid regions, the kernel size may be automatically/recursively increased until the number of disconnected grid regions is below a predetermined threshold in the resulting property mask.

In Block 640, an edge smoothing operation is performed on one or more expanded grid regions in accordance with one or more embodiments. After a grid region expansion, edges of the resulting grid regions may be softened to ensure a smooth transition zone and minimize discretization errors in the coarsened grid model. Thus, in some embodiments, a smoothed property mask is generated with one or more transition zones using an edge smoothing operation. A transition zone may be disposed between grid regions with a maximum coarsening level and grid regions with maximum refinement (e.g., original cells).

Furthermore, the edge smoothing operation may include applying one or more image filters to the adjusted property mask from Block 630. The image filter may be a Gaussian blur filter, a box filter, a motion blur filter, etc. In some embodiments, a 3×3 Gaussian blur filter $\omega_{GB}$ is used for the edge smoothing operation, which may be expressed using the following equation:

$$\omega_{GB} = \frac{1}{16}\begin{pmatrix} 1 & 2 & 1 \\ 2 & 1 & 2 \\ 1 & 2 & 1 \end{pmatrix}$$

In Block 650, an adjusted property mask is generated using a lookup operation for one or more coarsening levels and/or one or more refinement levels in accordance with one or more embodiments. In particular, continuous values within a property mask may be discretized to correspond to different coarsening levels and/or different refinement levels. In order to map the continuous values in a smoothed property mask, for example, a reservoir simulator may use a lookup table that defines numerical ranges associated with coarsening and/or refinement levels. The lookup table may use a linear uniform range, but more complex lookup tables are contemplated as well (e.g., logarithmic mapping tables).

In some embodiments, a reservoir simulator performs the discretization using a discretization function. In one example, the discretization function may correspond to the following equation:

$$f(x)=|\text{round}(\log_{10}x+1.10^{-nlevels})| \qquad \text{Equation 4}$$

Figure 7:
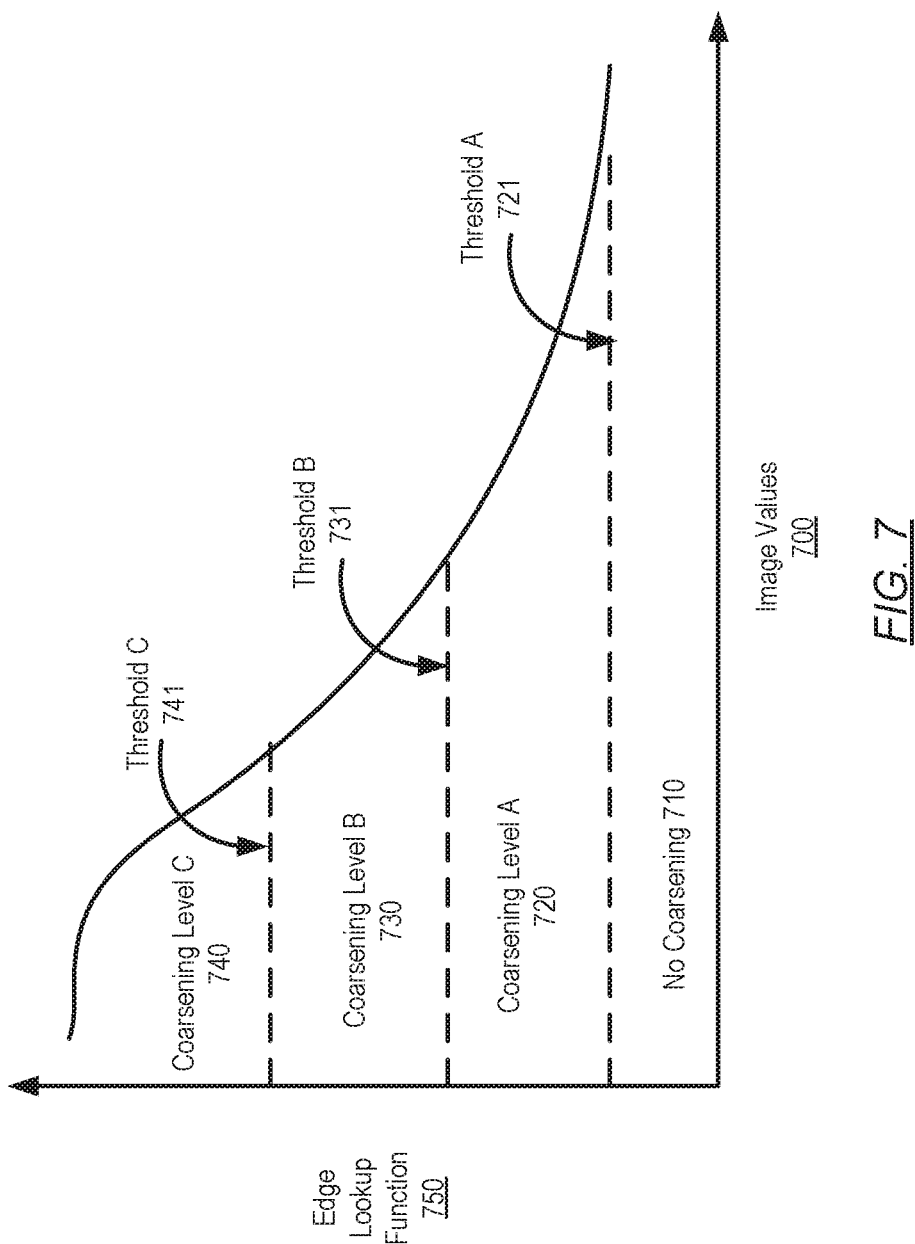
FIGS. 7, 8A, 8B, and 8C show examples in accordance with one or more embodiments.

Using a discretization function, the continuous values within a property mask may be assigned to different coarsening/refinement levels. Equation 4 may produce a mask discretization where max(f(x))=nlevels and min(f(x))=0. In another example, a lookup function may be used to discretize the values in the property mask. FIG. 7 is an example of a lookup operation in accordance with one or more embodiments. In FIG. 7, an edge lookup function (750) is applied to image values within an adjusted property mask. Where the cell values fall within a continuous series of image values (700), the edge lookup function (750) may discretize the image values (700) to determine various coarsening levels (i.e., no coarsening (710), coarsening level A (720), coarsening level B (730), and coarsening level C (740)). Likewise, the various ranges are defined according to various image thresholds, i.e., image threshold A (721), image threshold B (731), and image threshold C (741).

Returning to FIG. 6, in Block 660, a coarsened grid model is generated using model data and LGR statements based on an adjusted property mask in accordance with one or more embodiments. After generating an adjusted property mask, a reservoir simulator may use the adjusted property mask to generate various LGR statements. Since the grid regions generated in an adjusted property mask may be irregular, LGR boxes may not fit perfectly at one or more of the higher levels of coarsening. For more information regarding LGR statements, see FIG. 4 above and the accompanying description as well as Block 540 in FIG. 5 and the accompanying description.

In Block 670, a reservoir simulation is performed using a coarsened grid model in accordance with one or more embodiments. Block 670 may be similar to Block 550 described above in FIG. 5 and the accompanying description.

Figure 8A:
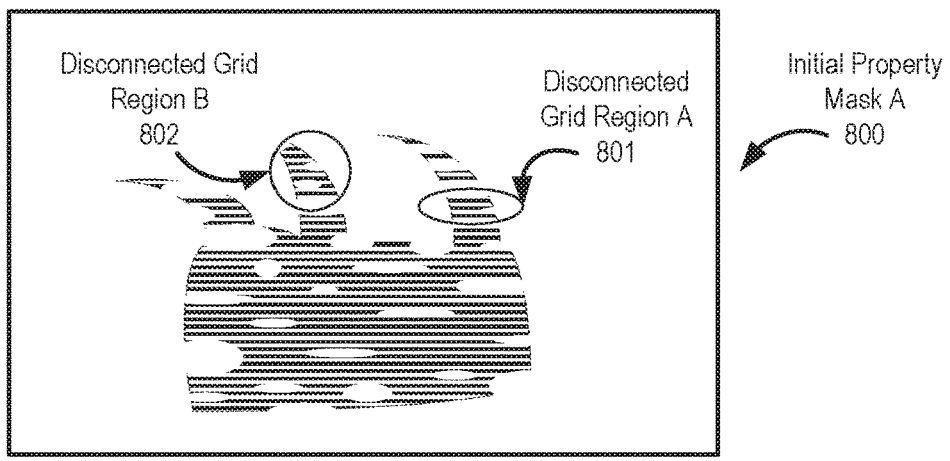
Figure 8B:
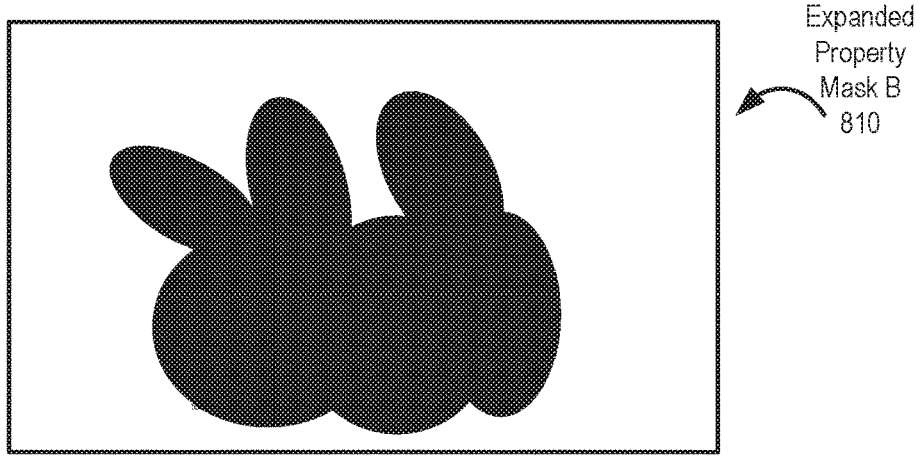
Figure 8C:
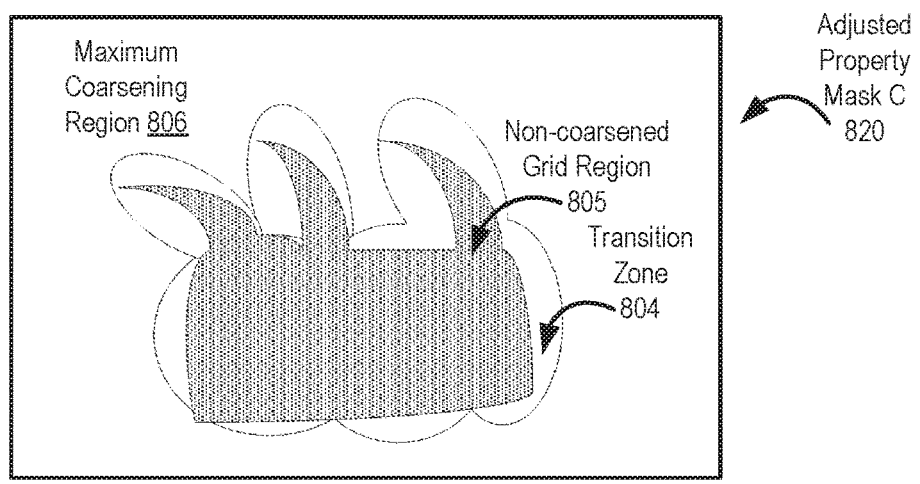

Turning to FIGS. 8A, 8B, and 8C, FIGS. 8A, 8B, and 8C provide an example of generating an adjusted property mask in accordance with one or more embodiments. The following examples are for explanatory purposes only and not intended to limit the scope of the disclosed technology.

Turning to FIG. 8A, FIG. 8A illustrates an initial property mask A (800) that is the result of applying a predetermined threshold to model data from a fine-grid model for a reservoir region of interest. As shown in FIG. 8A, the initial property mask A (800) results in a patchiness quality where the threshold function produces several disconnected grid regions (e.g., disconnected grid region A (801) and disconnected grid region B (802) are shown by circled regions of FIG. 8A). Turning to FIG. 8B, FIG. 8B illustrates an expanded property mask B (810) that is the output of an expansion operation being applied to initial property mask A (800). As shown in FIG. 8B, the solid black shape forms the expanded property mask B (810), while the white regions outside the expanded property mask are intended for maximum coarsening. For example, a reservoir simulator may apply one or more image filters to initial property mask A (800) to produce the expanded property mask B (810). This expanded property mask B (810) covers a larger area than the disconnected grid regions in the initial property mask A (800) in order to maintain the grid resolution of cells that may impact the reservoir property corresponding to the threshold function.

Turning to FIG. 8C, 8C illustrates an adjusted property mask (820) that is the output of the expanded property mask B (810) after applying a smoothing operation and an edge lookup operation. In the adjusted property mask C (820), a non-coarsened grid region (805) corresponds to the original cell resolution of the model data from a fine-grid model, while the transition zone (804) and the maximum coarsening region (806) are coarsened based on their respective coarsening levels. A reservoir simulator may then use the adjusted property mask C (820) after a lookup operation to generate a coarsened grid model for performing a reservoir simulation.

System and Method for Automatic Local Grid Refinement Using Decomposition Algorithms on Coarsening Masks In general, embodiments of the disclosure include systems and methods that use various decomposition algorithms to reduce a total number of LGR statements based on a multilevel coarsening mask. For example, a reservoir simulator may use a decomposition algorithm during an automated refinement/coarsening routine applied to a fine-grid model. In particular, a decomposition algorithm may describe a combinatorial process that decomposes 2D or 3D grid into various geometric shapes in order minimize the total number of shapes necessary to describe a coarsening mask. For example, decomposition may be rectangular decomposition that divides a grid into rectangular shapes of various sizes, which may be similar to various processes used in image compression. Likewise, other types of decomposition are also contemplated such as graph-based decomposition.

To illustrate an example of a decomposition algorithm, an original grid region with a size of 8×2 cells may be coarsened into a 4×1 grid region using 2×2 coarsening. The resulting grid may be expressed by the following LGR statements with 2×2 coarsening:

$LGR_1$: 1 2 1 2 1 1
$LGR_2$: 3 4 1 2 1 1
$LGR_3$: 5 6 1 2 1 1
$LGR_4$: 7 8 1 2 1 1

Each of the above LGR statements represents a single coarsened grid block of the final coarsened grid model. However, these four LGR statements may also be described using an equivalent LGR object statement that is more compact than the original LGR statements. For example, an LGR object statement may define the different LGR statements as a single rectangular array that includes four consecutive coarsened grid blocks. An example of an LGR object statement may be expressed by the following statement:

$LGR_{OPT}$: 1 8 1 2 4 1

From a geometric point of view, the above LGR object statement may be equivalent to determining a minimum number of rectangles of size L×W (length by width), where L and W may be multiples of an elementary coarsening size (or 1 for refinement that corresponds to original fine-grid cells). The process for generating and using LGR object statements will be described further in FIG. 9 below.

Figure 9:
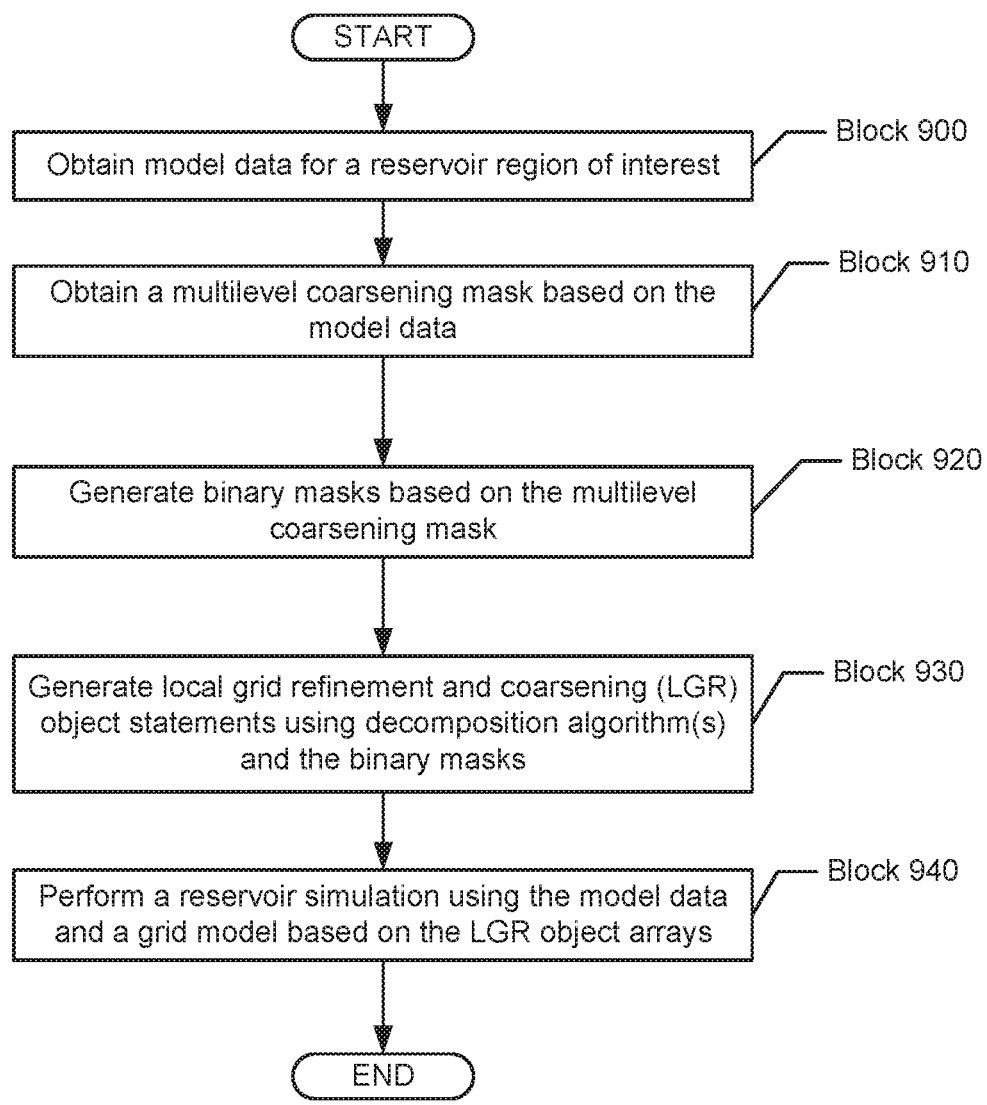
FIG. 9 shows a flowchart in accordance with one or more embodiments.

Turning to FIG. 9, FIG. 9 shows a flowchart in accordance with one or more embodiments. Specifically, FIG. 9 describes a specific method for simulating a reservoir region of interest using a coarsened grid model based on LGR object statements. One or more blocks in FIG. 9 may be performed by one or more components (e.g., reservoir simulator (160)) as described in FIGS. 1, 2B, and 4. While the various blocks in FIG. 9 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 900, model data is obtained for a reservoir region of interest in accordance with one or more embodiments. Block 900 may be similar to Block 500 described above in FIG. 5 and the accompanying description.

In Block 910, a multilevel coarsening mask is obtained based on model data in accordance with one or more embodiments. For example, the multilevel coarsening mask may be based on LGR statements that describe one or more coarsening levels for a coarsened grid model. For example, a series of LGR statements may be included in a binary or ASCII file to be read by a reservoir simulator. This file may be the result of a coarsening algorithm or manually by a user. Different LGR statements may be classified according to different coarsening levels in order to generate a multilevel coarsening mask.

In some embodiments, the multilevel coarsening mask is generated using a coarsening algorithm. For example, a multilevel coarsening mask may be the output of a property mask that is coarsened using a threshold function applied to one or more reservoir properties within the model data. In some embodiments, the multilevel coarsening mask may be similar to the multilevel coarsening mask X (400) described above in FIG. 4 and the accompanying description.

In Block 920, one or more binary masks are generated based on a multilevel coarsening mask in accordance with one or more embodiments. For example, a multilevel coarsening mask may be divided into separate binary layers that correspond to different coarsening levels. For more information on binary masks, see FIG. 4 above and the accompanying description.

In Block 930, various LGR object statements are generated using one or more decomposition algorithms and various binary masks in accordance with one or more embodiments. In particular, a decomposition algorithm may express a cellular array within a binary mask as a predetermined object shape, such as a rectangle, a square, a cubic volume as well as other geometric shapes. Furthermore, some examples of decomposition algorithms may be based on run-length encoding (RLE), largest inscribed block (LIB) decomposition, and graph-based decomposition (GBD). As such, a reservoir simulator may select one or more decomposition algorithms based on an amount of computational effort required to decompose a particular binary mask. For example, if a user desires a quick decomposition algorithm, an RLE process may be suggested to the user. After a binary mask is decomposed, the resulting geometric-shaped cell arrays may be used to generate various LGR object statements.

Turning to rectangular decomposition, a cell array within a binary mask may be decomposed into an object that includes rows and/or columns. In particular, rectangular decomposition may produce coarsened grid blocks that are continuous row segments. As such, the corresponding LGR object statement may store the coordinate of the beginning cell and the length of cells with respect to the cell array. In image compression, this technique is described as run-length encoding (RLE).

Keeping with rectangular decomposition, a rectangular decomposition algorithm may be expressed using the following equation:

$$M = \cup_{i=1}^{N} m_i \qquad \text{Equation 5}$$

where $m_i$ represents a rectangular partition and N is the number of partitions (N≥1), i correspond to a respective partition, M is the result of the rectangular decomposition, and the blocks are not overlapping. Rectangular decomposition may have a compression ratio γ expressed by the following equation:

$$\gamma = \frac{N}{N_{init}} \qquad \text{Equation 6}$$

where N represents the number of rectangles after decomposition and $N_{init}$ is the original number of LGR statements prior to performing a decomposition algorithm. Rectangular decomposition may be used in some embodiments because of the structured nature of the grid models found in reservoir simulations where a cell is described by a triplet with coordinates in (i,j,k) dimensions. While various decomposition processes are described with respect to a two-dimensional grid model, similar embodiments may be extended to a three-dimensional model with multiple model layers as well.

Turning to LIB decomposition, LIB decomposition algorithms may search a cell array for the largest block (e.g., a rectangle or a square) that may be inscribed within a binary mask. After determining the shape of the largest block, corresponding cell arrays may be removed from consideration that match the largest block. A decomposition algorithm may repeat a search within a binary mask to determine additional LGR object statements. Once the decomposition algorithm determines that no more cells remain in the binary mask for coarsening, the decomposition algorithm may end. An LIB decomposition algorithm may be different from a rectangular decomposition algorithm by selecting the largest object shape for a coarsening block while generating LGR object statements using multiple different shapes.

Turning to graph-based decomposition (GBD), a graph-based decomposition algorithm may partition a binary mask into cell arrays of specific polygonal shapes, such as convex polygons, star-shaped polygons, triangles, generally oriented rectangles, etc. As such, a graph-based decomposition algorithm may solve a graph partitioning problem using tools from graph theory. For example, a graph-based decomposition algorithm may generate LGR object statements within a binary mask that include uncoarsened holes.

Keeping with graph-based decomposition, vertices of a predetermined object may be divided into two groups: convex vertices that include an inner angle 90° and concave vertices that include an inner angle 270°. For example, a graph-based decomposition algorithm may use concave vertices to find the chords within a binary mask. Likewise, a graph-based decomposition algorithm may perform a hierarchical decomposition on two levels. On the first level, a graph-based decomposition algorithm may determine concave vertices within a binary mask and identify pairs of cogrid concave vertices (i.e. those having the same horizontal or vertical coordinates). Afterwards, the graph-based decomposition algorithm divides the resulting object into subpolygons by constructing chords which connect certain cogrid concave vertices. Accordingly, a graph-based decomposition algorithm may determine an optimal selection of chords within the binary mask, which may be equivalent to determining the maximal set of independent nodes in a graph.

In some embodiments, a reservoir simulator performs multiple decomposition algorithms on the same binary mask. Accordingly, based on the resulting LGR object statements from the different decomposition algorithms, a reservoir simulator may select which set of LGR statements to use for a coarsened grid model. For example, the reservoir simulator may compare the results of different decomposition algorithms based on various factors such as balancing cell array sizes among LGR object statements, limiting the size of the largest object shape, the total number of LGR object statements, etc.

Figure 10:
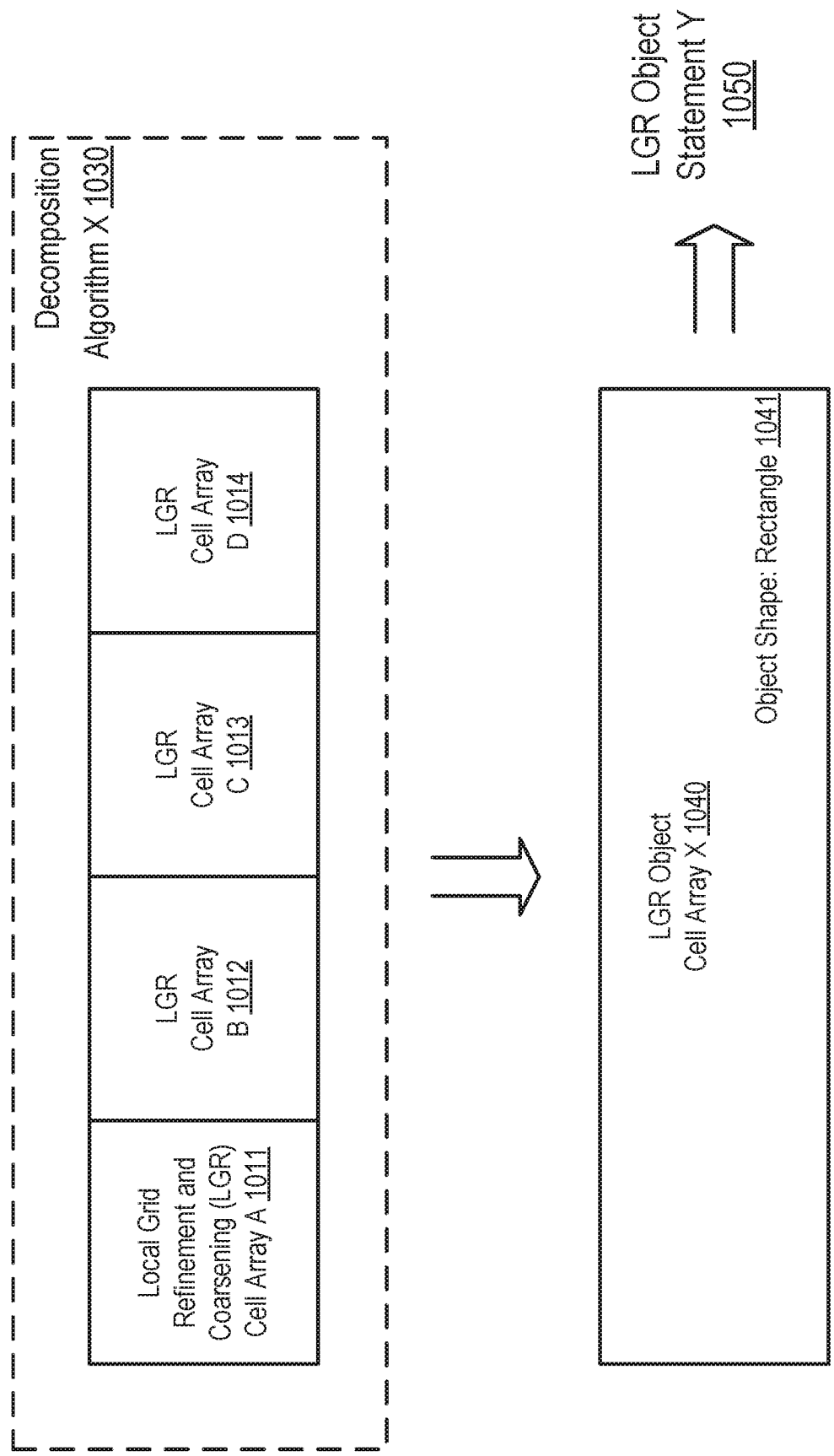
Figure 11B:
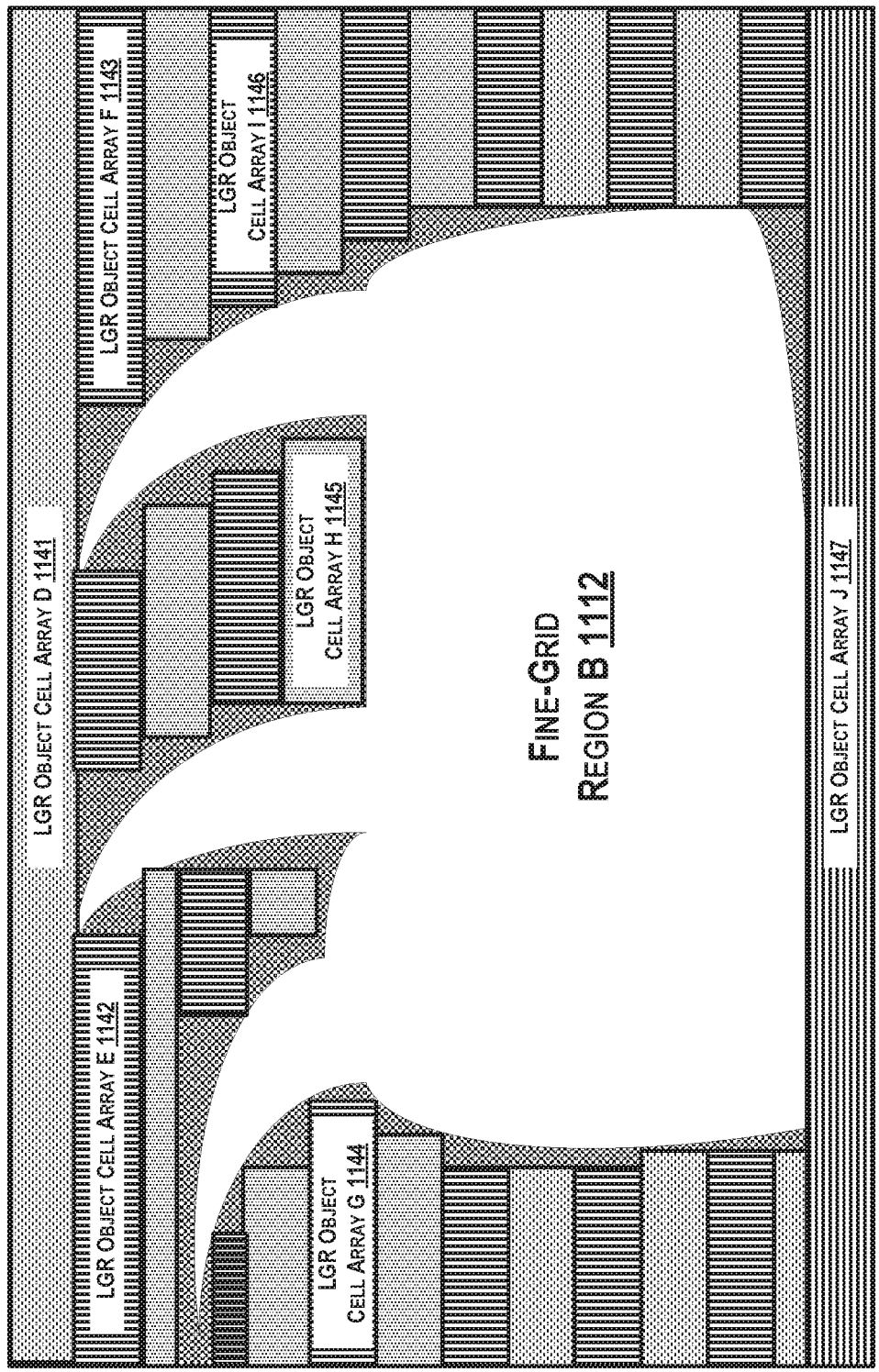

Turning to FIGS. 10, 11A, and 11B, FIGS. 10, 11A, and 11B provide examples of generating LGR object statements using decomposition algorithms in accordance with one or more embodiments. The following examples are for explanatory purposes only and not intended to limit the scope of the disclosed technology. In FIG. 10, various cell arrays within a binary mask (i.e., LGR cell array A (1011), LGR cell array B (1012), LGR cell array C (1013), LGR cell array D (1014)) are designated for coarsening. Where the four cell arrays (1011, 1012, 1013, 1014) typically correspond to four distinct LGR statements, a decomposition algorithm X (1030) determines a single LGR object cell array X (1040) that includes all four cell arrays (1011, 1012, 1013, 1014). In particular, the LGR object cell array X (1040) correspond to predetermined object shape of a rectangle (1041). The LGR object cell array X (1040) is subsequently transformed into an LGR object statement Y (1050) that may be read by a reservoir simulator for generating a coarsened grid model.

In FIG. 11A, a reservoir simulator obtains a binary mask Q (1100) for decomposition. The binary mask Q (1100) includes a binary object A (1110) that corresponds to a single coarsening level within a coarsened grid model. As shown in FIG. 11A, the binary object A (1110) includes several fine-grid regions (i.e., fine-grid region A (1111), fine-grid region B (1112), fine-grid region C (1113)), which are excluded from decomposition. Thus, the reservoir simulator applies a decomposition algorithm to the binary mask Q (1100), where a portion of the decomposition algorithm's output is shown in FIG. 11B. In FIG. 11B, the cells in the binary mask Q (1100) around the fine-grid region B (1112) undergo rectangular decomposition that produces various LGR object cell arrays (e.g., LGR object cell array D (1141), LGR object cell array E (1142), LGR object cell array F (1143), LGR object cell array G (1144), LGR object cell array H (1145), LGR object cell array I (1146), LGR object cell array J (1147)). Once the binary mask Q (1100) is decomposed fully into LGR object cell arrays, the LGR object cell arrays may be converted into LGR object statements.

Returning to FIG. 9, in Block 950, a reservoir simulation is performed using model data and a grid model based on various LGR object cell arrays in accordance with one or more embodiments. Block 950 may be similar to Block 550 described above in FIG. 5 and the accompanying description.

System and Method for Selecting Coarsening Scenarios for Reservoir Simulations

In preparation of a reservoir simulation, original groups of cells within a fine-grid model may be amalgamated together to produce coarsened grid blocks of different sizes. At the same coarsening level within a coarsening mask, for example, a reservoir simulator may determine different arrangements of coarsened grid blocks. In particular, the actual arrangements may have an effect on the results of a reservoir simulation, such as total computation time as well as accuracy of the actual simulations. More specifically, less blocks in a final grid model may result in less computations by the reservoir simulator and consequently a faster turnaround time for each reservoir simulation. Thus, an optimal arrangement of blocks that vary in size may be determined using a combinatorial algorithm. This arrangement of coarsened grid blocks may be referred to as a coarsening scenario. For example, a coarsening scenario may include various individual block arrangements of cell arrays that include 1×1, 2×2, etc. based on a coarsening mask. In particular, a coarsening scenario with fewer coarsened grid blocks may be advantageous over a coarsening scenario with more coarsened grid blocks.

In some embodiments, a reservoir simulator may generate multiple coarsening scenarios using one or more combinatorial algorithms, such as a greedy algorithm or dynamic programming algorithm. After comparing different coarsening scenarios using one or more criteria, a reservoir simulator or a user may select a particular coarsening scenario for generating a coarsened grid model for reservoir simulations.

Figure 12:
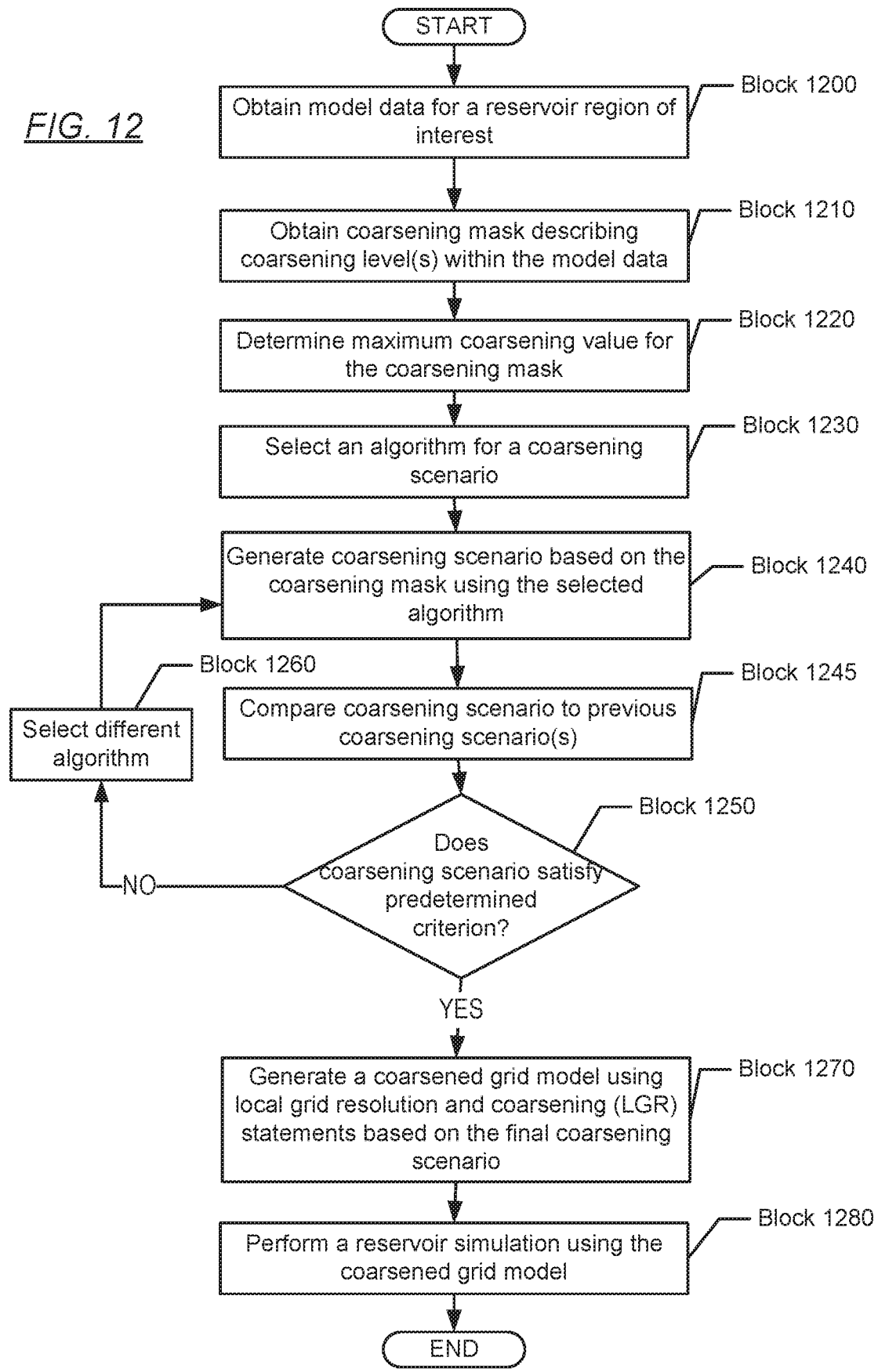
FIG. 12 shows a flowchart in accordance with one or more embodiments.

Turning to FIG. 12, FIG. 12 shows a flowchart in accordance with one or more embodiments. Specifically, FIG. 12 describes a specific method for determined a coarsening scenario for a reservoir grid model. One or more blocks in FIG. 12 may be performed by one or more components (e.g., reservoir simulator (160)) as described in FIGS. 1, 2B, and 4. While the various blocks in FIG. 12 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1200, model data is obtained for a reservoir region of interest in accordance with one or more embodiments. Block 1200 may be similar to Block 500 described above in FIG. 5 and the accompanying description.

In Block 1210, a coarsening mask is obtained that describes one or more coarsening levels within model data in accordance with one or more embodiments. For example, the coarsening mask may be a multilevel coarsening mask or a single level mask for generating a coarsened grid model.

To illustrate this coarsening, aquifer regions may be selected for coarsening in a reservoir region of interest, while hydrocarbon-bearing regions may have their resolution unchanged in the coarsened grid model. In some embodiments, a coarsening mask is generated from a property mask. For more information on generating a coarsening mask from a property mask, see Block 610 above in FIG. 6 and the accompanying description.

In Block 1220, a maximum coarsening level is determined for a coarsening mask in accordance with one or more embodiments. For example, a reservoir simulator may obtain the maximum coarsening level from a user or as an attribute associated with a coarsening mask file. Using a value for the maximum coarsening level, a coarsening scenario may be generated accordingly in Blocks 1230-1250 below.

In some embodiments, a maximum coarsening level of a particular grid model is determined automatically by a reservoir simulator. For example, a reservoir simulator may initiate a search for the maximum coarsening level over the coarsening mask. Using a predetermined block size, the reservoir simulator may attempt to fit a coarsening block within original cells of the coarsening mask. After completing an iteration over each cell in the coarsening mask, the reservoir simulator may reduce the predetermined block size and attempt to fit the updated coarsening grid block in the coarsening mask until the maximum block size is determined.

In Block 1230, an algorithm is selected for a coarsening scenario in accordance with one or more embodiments. In particular, an optimal arrangement of blocks within a coarsened grid model may be viewed as a combinatorial optimization problem, such as Knapsack problem, a bin packing problem, or cutting stock problem. Multiple types of algorithms, such as combinatorial algorithms, may be selected that may include different input parameters. In some embodiments, a reservoir simulator uses a greedy algorithm and/or a dynamic programming algorithm to determine a particular coarsening scenario with one or more desired characteristics of the output arrangement.

Turning to greedy algorithms, greedy algorithms may include a class of mathematical algorithms that determine a local optimal choice at each step in the algorithm when attempting to determine a global optimal solution to a problem. As such, greedy algorithms may be susceptible to providing solutions limited by local maxima. In contrast, the global optimal solution may not be a sum of various local optimal solutions. With respect to a coarsening scenario, a greedy algorithm may determine a starting location and a starting block size (e.g., maximum coarsening level) for searching a coarsening mask. The greedy algorithm may proceed to search the binary mask for a fit of the largest coarsened grid block beginning at multiple different starting locations. After determining one coarsening scenario, a greedy algorithm may use a different block size to search the coarsening mask. Different starting locations and block size may generate different block arrangements with different numbers of blocks.

Turning to dynamic programming algorithms, a dynamic programming algorithm may be a mathematical algorithm that divides a problem into a collection of smaller sub-problems. For example, a dynamic programming algorithm may solve a sub-problem only once and then store the solution to the respective sub-problem in a table, thereby avoiding a computation of the solution again in the future.

As such, a dynamic programming algorithm may determine a global solution based on multiple solutions of sub-problems.

With respect to a coarsening scenario, a dynamic programming algorithm may divide a coarsening mask into multiple smaller sub-grids. After searching a particular sub-grid, a dynamic programming algorithm may expand the sub-grid in an X-direction and/or Y-direction to generate a new sub-grid for searching. The dynamic programming algorithm may iteratively expand the sub-grid until a block arrangement is determined for a complete grid of a coarsening mask. In some embodiments, the dynamic programming algorithm may store a portion of a local solution determined for the previous sub-grid for reuse in one or more subsequent searches of expanded sub-grids. By backtracking and reusing previously calculated solutions, a dynamic programming algorithm may reduce computational time and resources for determined a coarsening scenario.

In Block 1240, a coarsening scenario is generated based on a selected algorithm in accordance with one or more embodiments. Using a selected algorithm, a reservoir simulator may generate a coarsening scenario based on the coarsening mask from Block 1210.

In Block 1245, a coarsening scenario is compared to one or more previous coarsening scenarios in accordance with one or more embodiments. For example, a reservoir simulator may analyze a coarsening scenario for whether a predetermined criterion, such as a specified threshold is exceeded by the coarsening scenario. Likewise, a reservoir simulator may also compare different coarsening scenarios based on coarsening ratios between respective coarsening scenarios, the number of LGR statements or LGR object statements required to generate a coarsened grid model from the respective coarsening scenario, balance among block sizes, expected simulation runtime, etc.

In Block 1250, a determination is made whether a coarsening scenario satisfies a predetermined criterion in accordance with one or more embodiments. Using the comparison from Block 1245, for example, a reservoir simulator may determine whether one or more predetermined criteria are satisfied. Examples of predetermined criteria may include computational time limits for generating a coarsened grid model, a specific iteration limit on performing Blocks 1240-1260, and/or a percentage improvement over the previous coarsening scenarios. For example, a reservoir simulator may analyze the differences between coarsening scenarios to determine whether a coarsening scenario parameter is converging to an optimum value.

If a predetermined criterion is not satisfied, a reservoir simulator may determine whether to perform one or more iterations of Blocks 1240-1260 for optimizing the coarsening scenario for a coarsened grid model. When a determination is made that at least one of the generated coarsening scenarios satisfies a predetermined criterion, the process may proceed to Block 1250. When a determination is made that none of the coarsening scenarios satisfy the predetermined criterion, the process may proceed to Block 1260.

In Block 1260, a different algorithm is selected in accordance with one or more embodiments. For example, a different combinatorial algorithm may be selected in a similar manner as described above in Block 1230. In particular, a reservoir simulator may reuse the same type of selected algorithm from the previous iteration with different parameters, e.g., largest block size, starting location, or initial sub-grid with respect to a dynamic programming algorithm.

In Block 1270, a coarsened grid model is generated using various LGR statements based on a final coarsening scenario in accordance with one or more embodiments. More specifically, the final coarsening scenario may be used to generate LGR statements and/or LGR object statements. A reservoir simulator may use these statements to generate a coarsened grid model accordingly. For more information on LGR statements and LGR object statements, see FIGS. 4, 9, 10, 11A, and 11B above and the accompanying description. In some embodiments, the final coarsening scenario includes the lowest number of LGR statements and/or LGR object statements among the coarsening scenarios determined in Blocks 1230-1260, which may be advantageous for reservoir simulation users.

In Block 1280, a reservoir simulation is performed using a grid model based on model data and a coarsening scenario in accordance with one or more embodiments. Block 1280 may be similar to Block 550 described above in FIG. 5 and the accompanying description.

Turning to FIGS. 13A, 13B, 14A, and 14B, FIGS. 13A, 13B, 14A, and 14B provide examples of generating coarsening scenarios using combinatorial algorithms in accordance with one or more embodiments. The following examples are for explanatory purposes only and not intended to limit the scope of the disclosed technology.

Figure 13A:
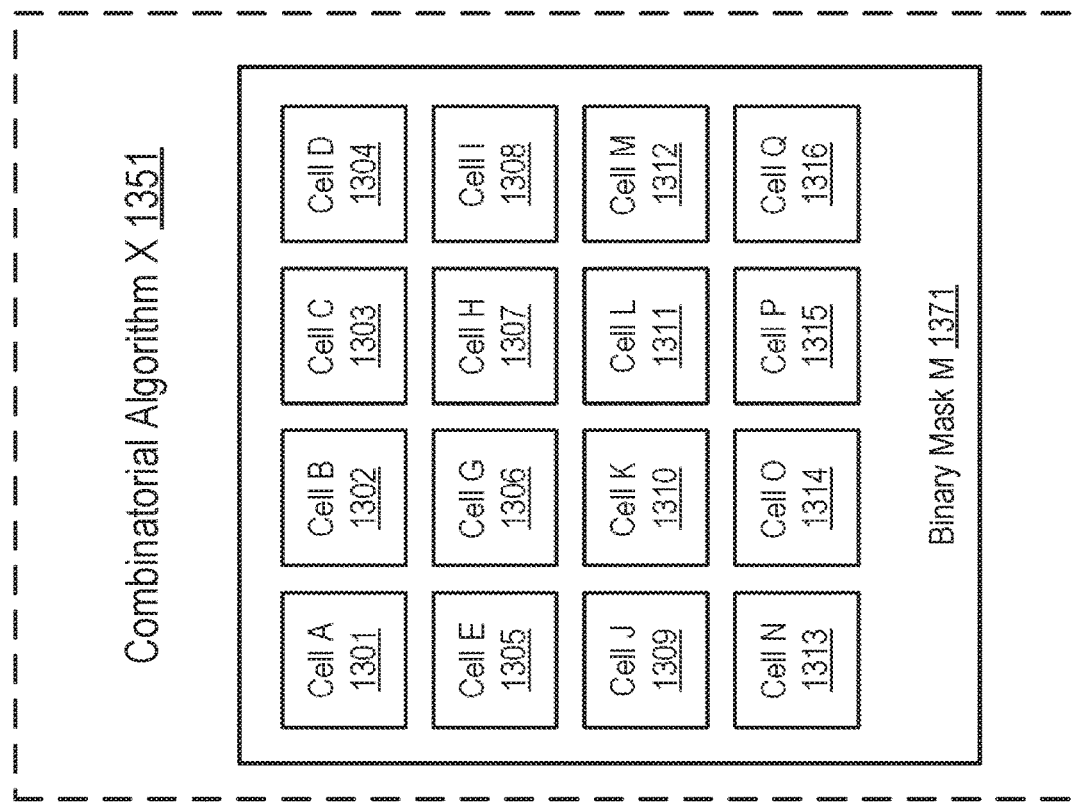

Turning to FIG. 13A, a reservoir simulator applies a combinatorial algorithm X (1351) to various cells (i.e., cell A (1301), cell B (1302), cell C (1303), cell D (1304), cell E (1305), cell G (1306), cell H (1307), cell I (1308), cell J (1309), cell K (1310), cell L (1311), cell M (1312), cell N (1313), cell O (1314), cell P (1315), cell Q (1316)) within a binary mask M (1371). In particular, the combinatorial algorithm X (1351) is a type of greedy algorithm initially searches the binary mask M (1371) using a 3×3 block size. After identifying that block A (1321) provides the only match to the 3×3 block size within the binary mask M (1371), the combinatorial algorithm X (1351) performs another search with a 2×2 block size. However, the combinatorial algorithm X (1351) determines no matches according to this block size. Finally, the combinatorial algorithm X (1351) performs a search using a 1×1 block size, which results in various blocks (i.e., block B (1322), block C (1323), block D (1324), block E (1325), block F (1326), block G (1327), block H (1328)). Thus, the resulting coarsening scenario A (1361) includes an arrangement of 8 total blocks.

Figure 13B:
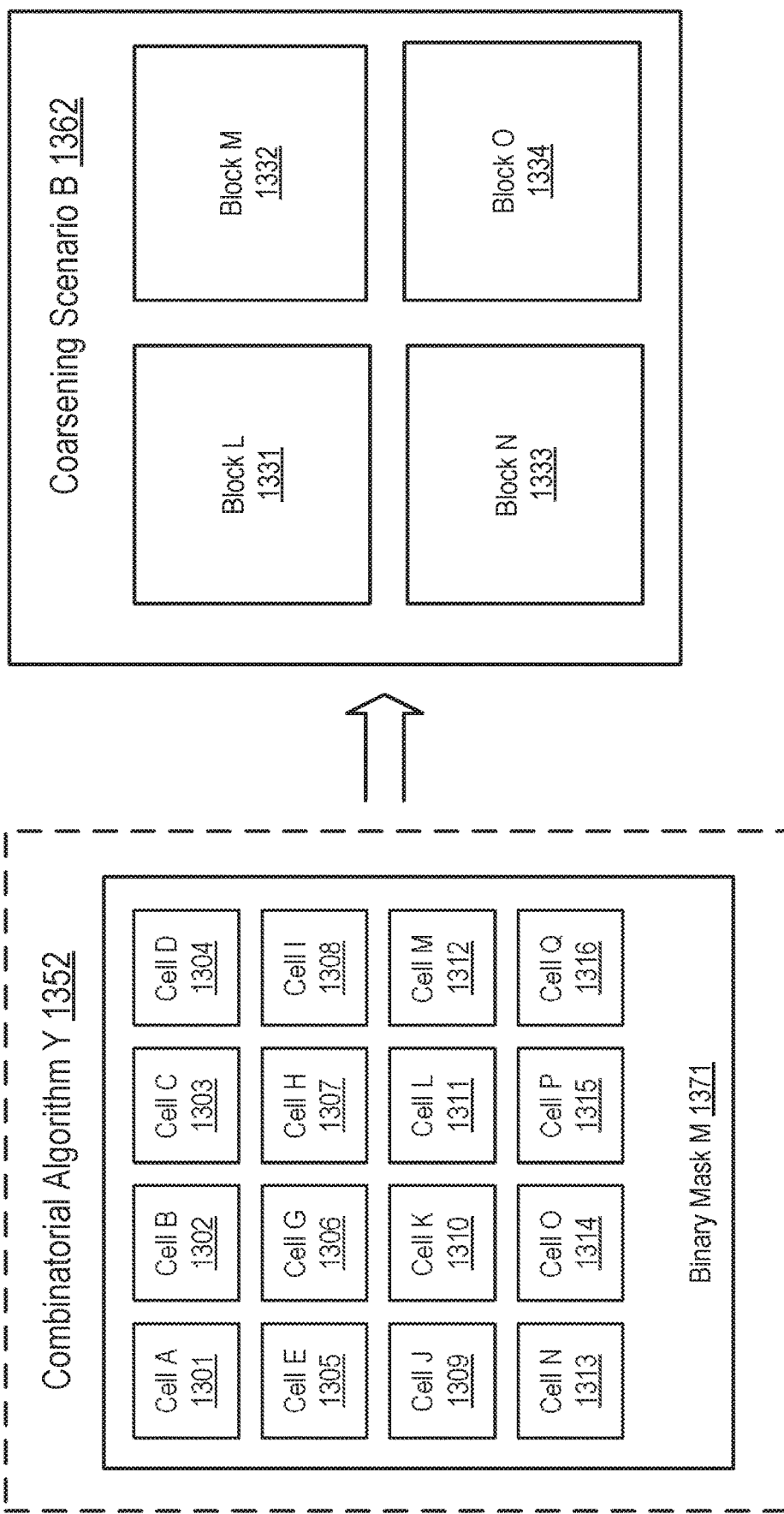

Turning to FIG. 13B, a reservoir simulator applies a combinatorial algorithm Y (1352) to the cells (1301, 1302, 1303, 1304, 1305, 1306, 1307, 1308, 1309, 1310, 1311, 1312, 1313, 1314, 1315, 1316) within the binary mask M (1371). Here, combinatorial algorithm Y (1352) is a different greedy algorithm than combinatorial algorithm X (1351) that initially searches the binary mask M (1371) using a 2×2 block size instead of a 3×3 block size. As such, the combinatorial algorithm Y (1352) performs a single search with a 2×2 block size that results in four coarsened grid blocks (i.e., block L (1331), block M (1332), block N (1333), block O (1334)). After the initial search, the combinatorial algorithm Y (1352) determines the resulting coarsening scenario B (1362) includes an arrangement of 4 total blocks. Based on a comparison between coarsening scenario A (1361) and coarsening scenario (1362), a reservoir simulator may determine that a particular coarsening scenario better satisfies a predetermined criterion, e.g., by comparing coarsening ratios of the coarsening scenarios (1361, 1362).

Figure 14A:
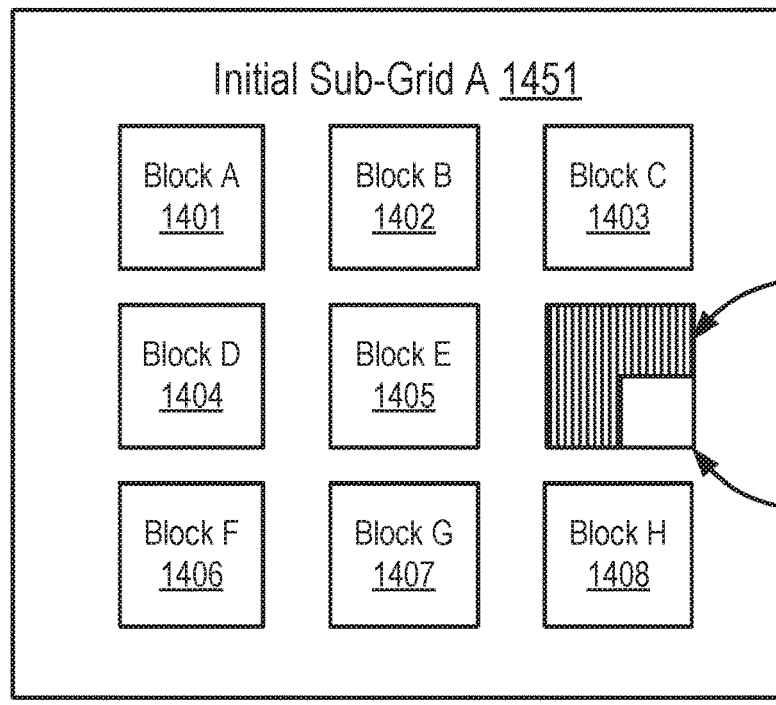
Figure 14A:
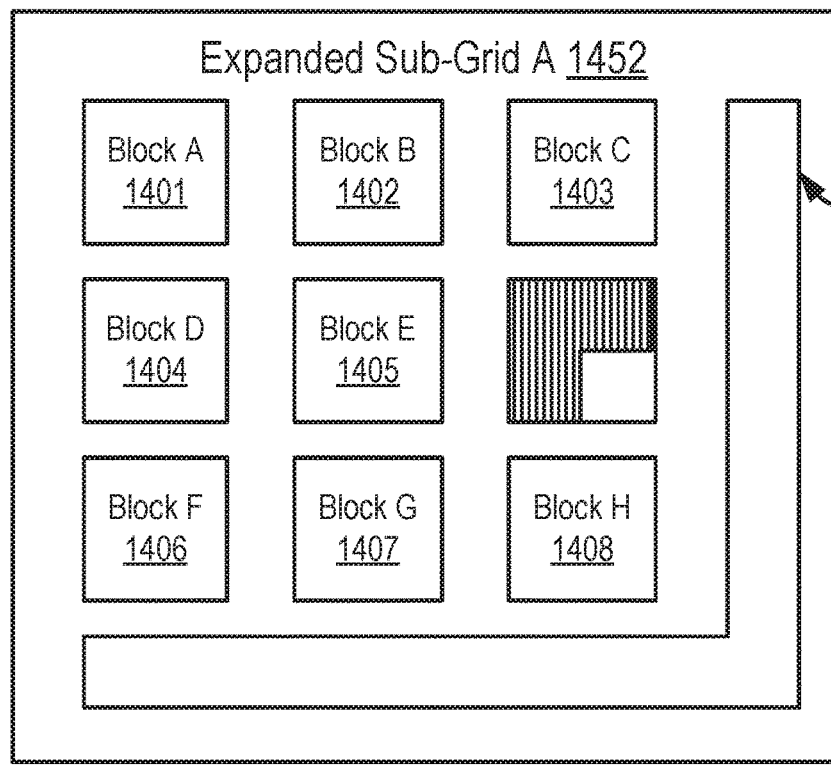

Turning to FIG. 14A, FIG. 14A includes a dynamic programming algorithm Z (1490) generates an initial sub-grid A (1451) based on a binary mask (not shown). The initial sub-grid A (1451) includes noncoarsened cells (1421) with a resolution unchanged in a final coarsened grid model and various cells for coarsening (e.g., cell for coarsening (1422)). After performing an initial search using a 2×2 block size, the dynamic programming algorithm C (1490) determines search results for a partial coarsening scenario that includes various blocks (i.e., block A (1401), block B (1402), block C (1403), block D (1404), block E (1405), block F (1406), block G (1407), block H (1408)). After determining the search results for the initial sub-grid A (1451), the dynamic programming algorithm C (1451) determines an expanded sub-grid A (1452) with additional cells (i.e., expansion (1423)). In particular, the search results for block A (1401), block B (1402), block D (1404), and block E (1405) may be reused based on the maximum coarsened cell size (i.e., 2×2) in this example. Likewise, with a maximum coarsened cell of 2×2 in one embodiment, any blocks that are farther than two blocks may be reused without a risk of obtaining a sub-optimal solution. However, block C (1403), block F (1406), block G (1407), block H (1408) may be discarded as being less than 2 blocks away from the expansion (1423).

Figure 14B:
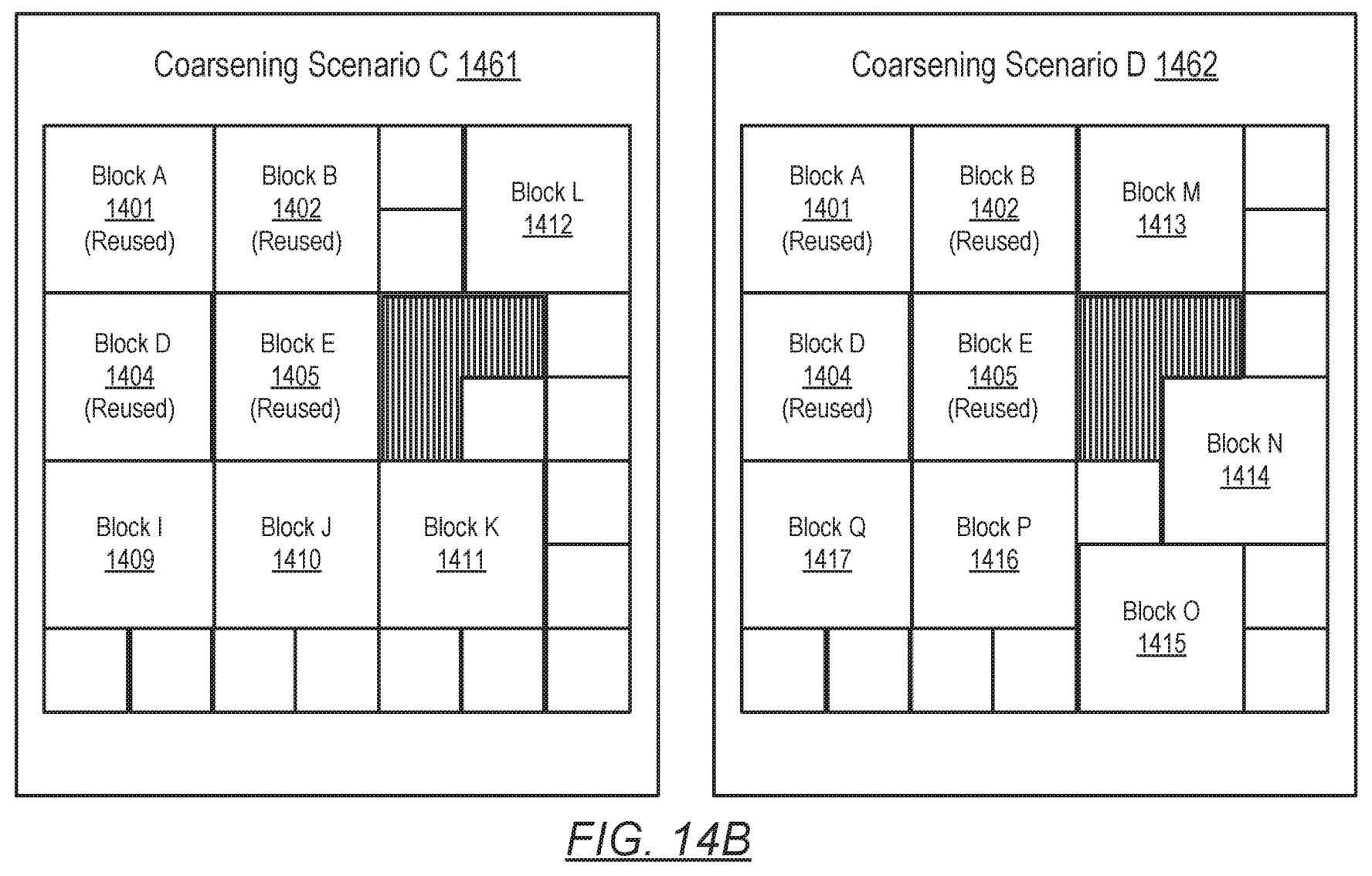

Turning to FIG. 14B, the dynamic programming algorithm C (1490) reuses blocks from the previous search, i.e., block A (1401), block B (1402), block D (1404), and block E (1405), in order to reduce the computational load of the expanded search. By selecting different starting locations, the dynamic programming algorithm C (1490) determines two different coarsening scenarios, i.e., a coarsening scenario C (1461) and a coarsening scenario D (1462). In coarsening scenario C (1461), the dynamic programming algorithm C (1490) begins a search in the bottom left corner of the expanded sub-grid A (1452) to determine a 2×2 block (i.e., block I (1409)). Afterwards, the dynamic programming algorithm C (1490) continues the search from the bottom left of the expanded sub-grid A (1452) until the search reaches the top right of the expanded sub-grid A (1452). In the end result of coarsening scenario C (1461), the dynamic programming algorithm C (1490) determines several additional 2×2 blocks (i.e., block J (1410), block K (1411), block L (1412)) for the coarsening scenario C (1461) along with various 1×1 cells.

Keeping with FIG. 14B, in coarsening scenario D (1462), the dynamic programming algorithm C (1490) begins a search in the expanded sub-grid A (1452) at the cells adjacent to block B (1402) to determine a 2×2 block (i.e., block I (1409)). Afterwards, the dynamic programming algorithm C (1490) performs a search for another 2×2 block along the right side perimeter of the expanded sub-grid A (1452). The dynamic programming algorithm C (1490) subsequently determines four additional 2×2 blocks (i.e., block N (1414), block O (1415), block P (1416), block Q (1417)) for the coarsening scenario D (1462) along with various 1×1 cells. Thus, the resulting coarsening scenario D (1462) results in fewer total blocks than coarsening scenario D (1461). Therefore, a reservoir simulator selects coarsening scenario D (1462) over coarsening scenario C (1461) based on comparing coarsening ratios of the coarsening scenarios (1461, 1462).

Figure 14C:
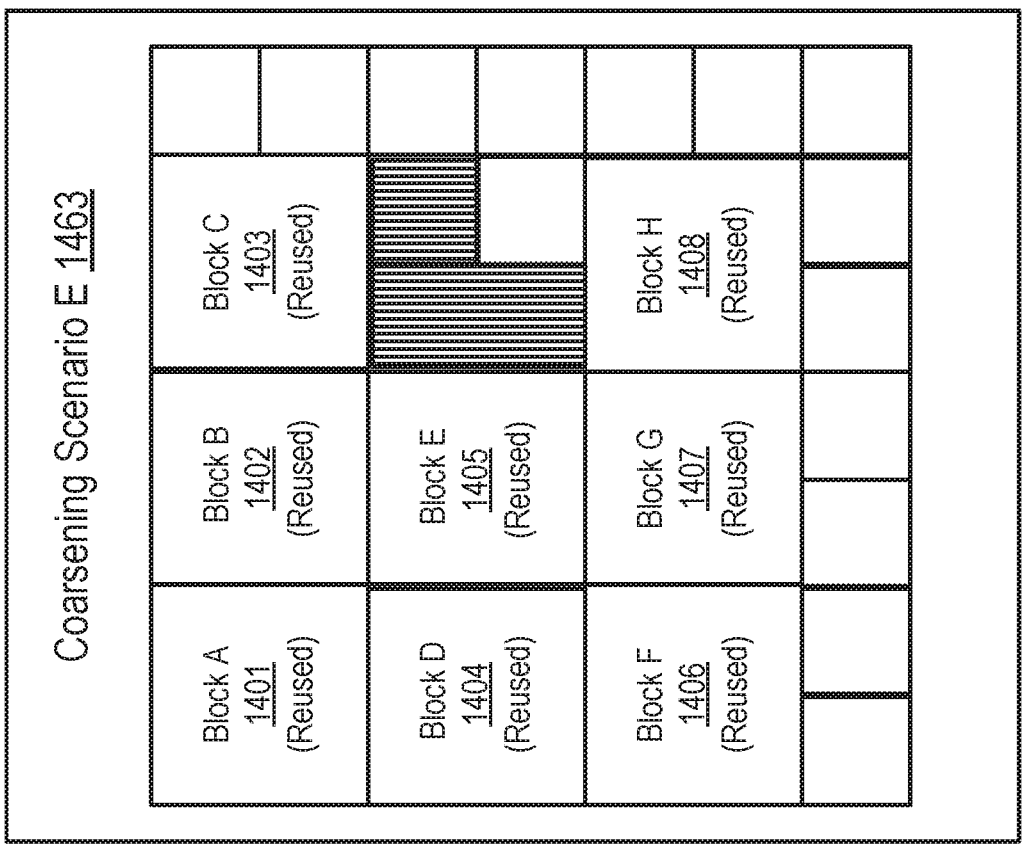

Turning to FIG. 14C, the dynamic programming algorithm C (1490) reuses all blocks from the previous search, i.e., block A (1401), block B (1402), block D (1404), and block E (1405), etc. in coarsening scenario E (1463). Accordingly, no cells from the expansion (1423) are coarsened in this coarsening scenario.

System and Method for Flow-Based Coarsening of Reservoir Grid Models

In order to reduce computational time, a coarsened grid model may be generated from a fine-grid model. In general, it is safer to coarsen cells that do not contribute to a total flow of a reservoir region, because a slight change on reservoir properties, i.e. permeability, porosity or saturations, may impact reservoir simulations. Accordingly, flow properties may be determined for a reservoir region of interest using streamlines. In particular, the streamlines described above in FIG. 3 and the accompanying description may provide the basis for an automated workflow for generating and/or verifying a coarsened grid model.

Figure 15:
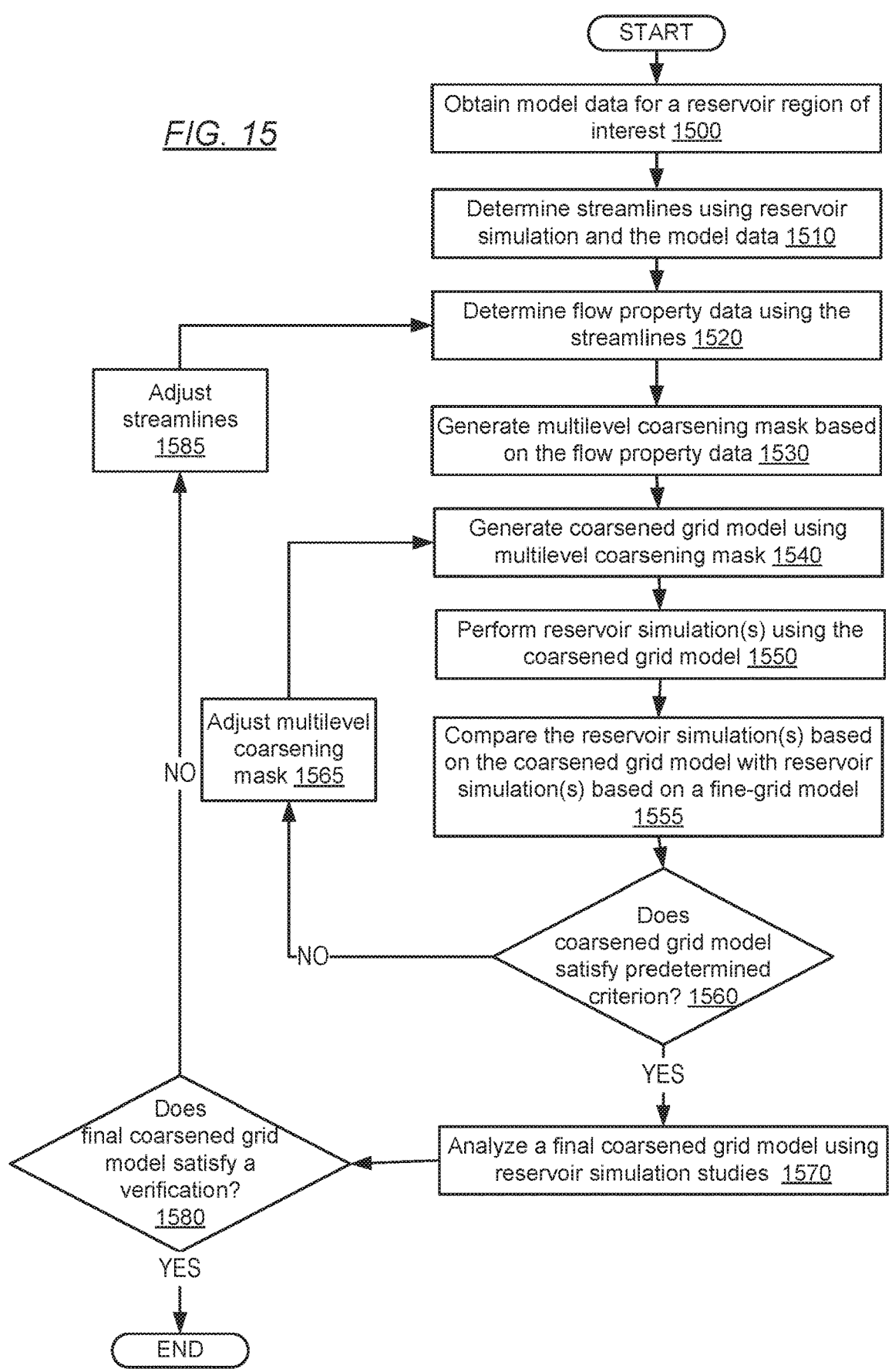
FIG. 15 shows a flowchart in accordance with one or more embodiments.

Turning to FIG. 15, FIG. 15 shows a flowchart in accordance with one or more embodiments. Specifically, FIG. 15 describes a specific method for performing a reservoir simulation using a well assignment. One or more blocks in FIG. 15 may be performed by one or more components (e.g., reservoir simulator (160)) as described in FIGS. 1, 2B, and 4. While the various blocks in FIG. 15 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1500, model data is obtained for a reservoir region of interest in accordance with one or more embodiments. Block 1500 may be similar to Block 500 described above in FIG. 5 and the accompanying description.

In Block 1510, various streamlines are determined using a reservoir simulation and model data in accordance with one or more embodiments. For example, a reservoir simulator may generate various streamlines for the reservoir region of interest similar to the streamlines Z (320) described above in FIG. 3 and the accompanying description.

In Block 1520, flow property data is determined using various streamlines in accordance with one or more embodiments. For example, flow property data may be dynamic data that describes various reservoir connections within a reservoir region of interest. In some embodiments, the flow property data includes time of flight (TOF) information regarding one or more streamlines. More specifically, TOF information may describe a particle travel time along a streamline within the reservoir region of interest. A shorter travel time of the particle may correspond to a stronger reservoir connection, while a longer travel time may correspond to a weaker reservoir connection. Thus, a reservoir simulator may use streamlines in a particular simulation period to determine one or more dynamic flow property values. Likewise, flow property data may be discretized flow information outputted from streamline tracing software, such as a flux value file obtained after performing a streamline simulation.

In Block 1530, a multilevel coarsening mask is generated based on flow property data in accordance with one or more embodiments. In some embodiments, for example, a multilevel coarsening mask is generated using TOF information. For example, TOF information throughout a reservoir region of interest may provide a coarsening weight for determining various coarsening levels in a coarsened grid model. In some embodiments, a reservoir simulator may use flow property data with static reservoir properties to determine coarsening levels. Examples of static reservoir properties may include well-to-well correlations, rock properties, pressure gradients, oil-water contact interfaces, fluid properties, etc. To generate a multilevel coarsening mask, the flow property data may be inputted into one or more coarsening algorithms based on flow information. For example, a coarsening level may be based on a magnitude of a flow property value. A lower flow property value may correspond to a higher amount of coarsening. As such, a coarsening algorithm may transform a flow property mask into a multilevel coarsening mask. Likewise, a coarsening algorithm may use flow property data to generate one or more binary mask. In some embodiments, a coarsening algorithm includes a coarsening lookup function.

Figure 16:
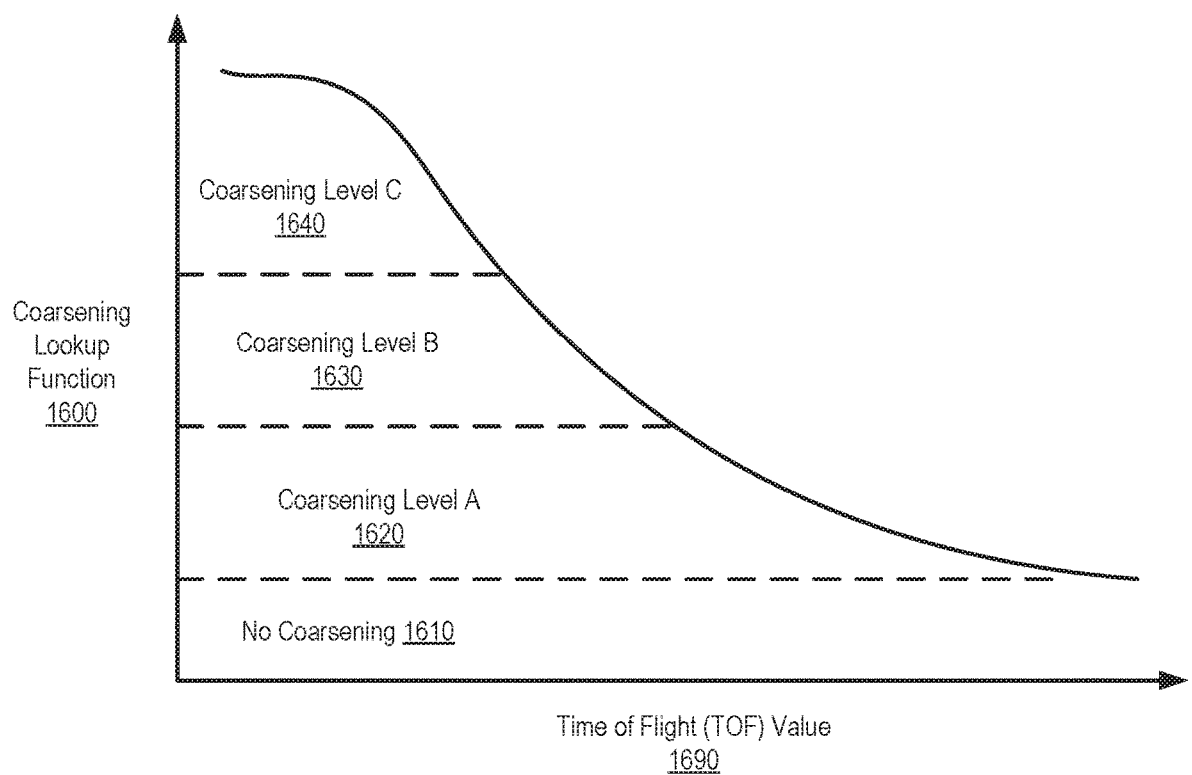
FIGS. 16, 17A, 17B, and 17C show examples in accordance with one or more embodiments.

Turning to FIG. 16, FIG. 16 shows an example of a coarsening lookup function in accordance with one or more embodiments. In FIG. 16, a coarsening lookup function (1600) uses time of flight values (1690) to determine various coarsening levels (i.e., no coarsening (1610), coarsening level A (1620), coarsening level B (1630), coarsening level C (1630)). For example, the time of flight values (1690) may be a continuous set of values that are discretized based on different value ranges. The coarsening lookup function (1600) may be a linear function, logarithmic function, exponential function, etc. These values ranges correspond accordingly to different levels of coarsening. In some embodiments, the coarsening levels (1610, 1620, 1630, 1640) may be based on user-defined thresholds. This approach naturally creates a smooth transition zone between coarsening levels, this helps to minimizing discretization errors arising for non-orthogonal cells in a two-point flux approximation. Moreover, the coarsening lookup function (1600) may be similar to the edge coarsening lookup function (750) described above in FIG. 7 and the accompanying description.

Returning to FIG. 15, in Block 1540, a coarsened grid model is generated using a multilevel mask in accordance with one or more embodiments. For example, a reservoir simulator may generate a coarsened grid model based on the reservoir region of interest similar to the coarsened grid model generated in Block 540 described above in FIG. 5 and the accompanying description.

In Block 1550, a reservoir simulation is performed using a coarsened grid model in accordance with one or more embodiments. Block 1550 may be similar to Block 550 described above in FIG. 5 and the accompanying description.

In Block 1555, one or more reservoir simulations based on a coarsened grid model are compared with one or more reservoir simulations based on a fine-grid model in accordance with one or more embodiments. For example, a reservoir simulator may perform a quality check on the coarsened grid model in Block 1560 and again in Block 1580 below. More specifically, reservoir simulation results from the coarsened grid model may be tested against a fine-grid model to confirm whether the coarsened grid model satisfies an accuracy threshold or other criterion. Likewise, simulations from different coarsened grid models may also be compared.

In Block 1560, a determination is made whether a coarsened grid model satisfies a predetermined criterion in accordance with one or more embodiments. Using the comparison from Block 1555, for example, a reservoir simulator may determine the difference between the coarsened grid model and a fine-grid model. Furthermore, the predetermined criterion may be a specified accuracy threshold to determine whether the mismatch between the coarsened grid model and a fine-grid model is outside a specific tolerance. When a determination is made that the coarsened grid model satisfies the predetermined criterion, the process may proceed to Block 1570. When a determination is made that the coarsened grid model fails to satisfy the predetermined criterion, the process may proceed to Block 1565.

In Block 1565, a multilevel coarsening mask is adjusted in accordance with one or more embodiments. For example, thresholds in a coarsening lookup function may be adjusted to increase a match between the coarsened grid model and a fine-grid model. Likewise, the number of coarsened levels in the multilevel coarsening mask may be modified to reduce the amount of discretization error in the coarsened grid model. After adjusting the multilevel coarsening mask, Blocks 1540-1560 may be repeated to determine whether a new coarsened grid model satisfied the predetermined criterion at Block 1560.

In Block 1570, a final coarsened grid model is analyzed using one or more reservoir simulation studies in accordance with one or more embodiments. The final coarsened grid model may be the coarsened grid model output from Block 1560. In some embodiments, one or more comparisons are performed with the final coarsened grid model to verify simulation accuracy. Likewise, the comparisons may include performing various multi-realization studies such as history matching to verify the final coarsened grid model. History matching may include the process of calibrating the final coarsened grid model to match acquired reservoir data, such as well log data, coring data, or seismic data. History matching may be performed over multiple iterations that fine-tune model parameters based on repeated comparisons between the coarsened grid model and the acquired reservoir data.

In Block 1580, a final coarsened grid model is verified in accordance with one or more embodiments. This verification provides an additional level to confirm by a reservoir simulator whether the final coarsened grid model has sufficient accuracy. When a determination is made that the coarsened grid model is verified using one or more reservoir simulation studies, the process may end. When a determination is made that the coarsened grid model fails the verification, the process may proceed to Block 1585.

In Block 1585, streamlines are adjusted in accordance with one or more embodiments. In particular, streamlines may be simulated again in order generate updated flow property data for generating another multilevel coarsening mask.

Figure 17A:
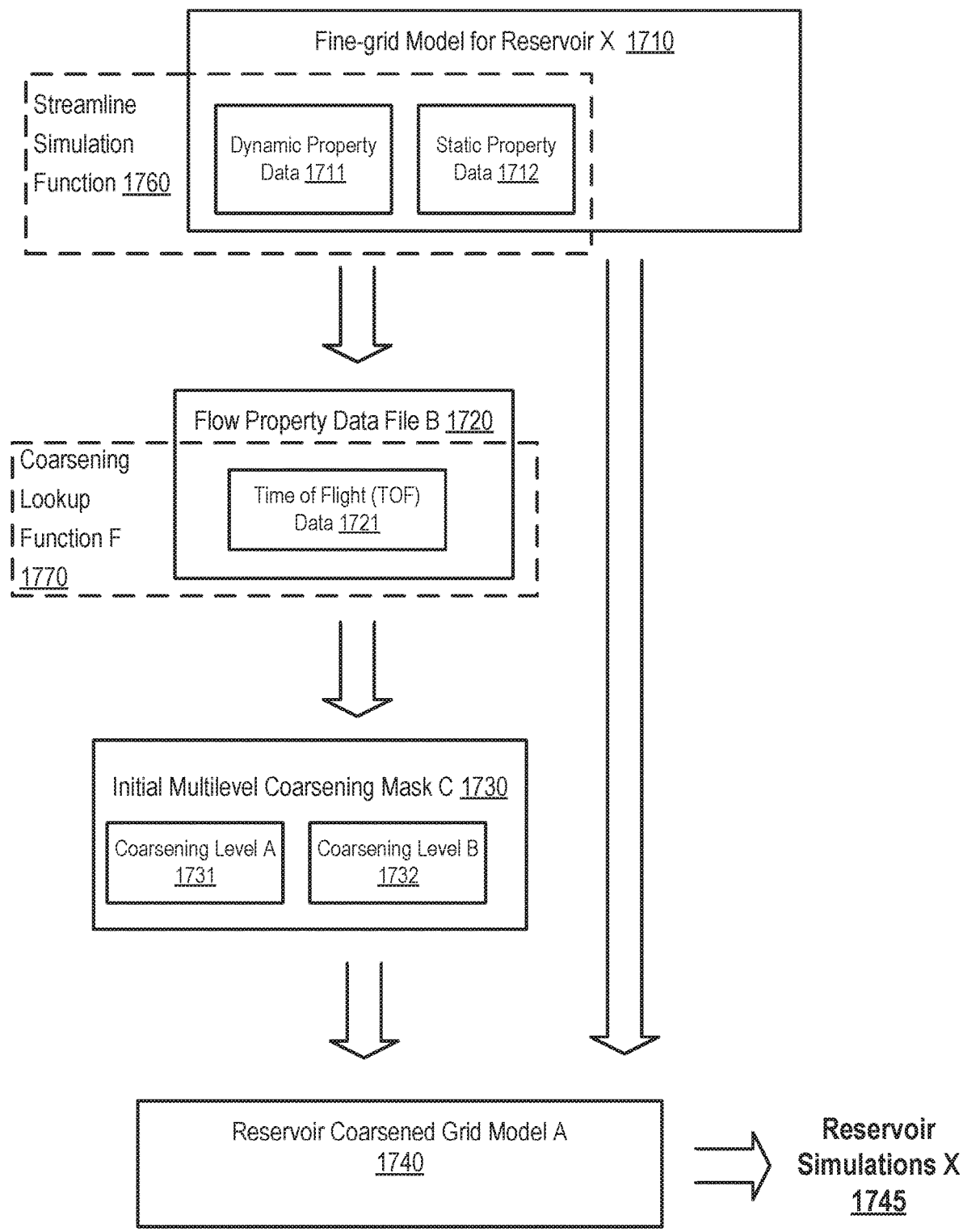
Figure 17B:
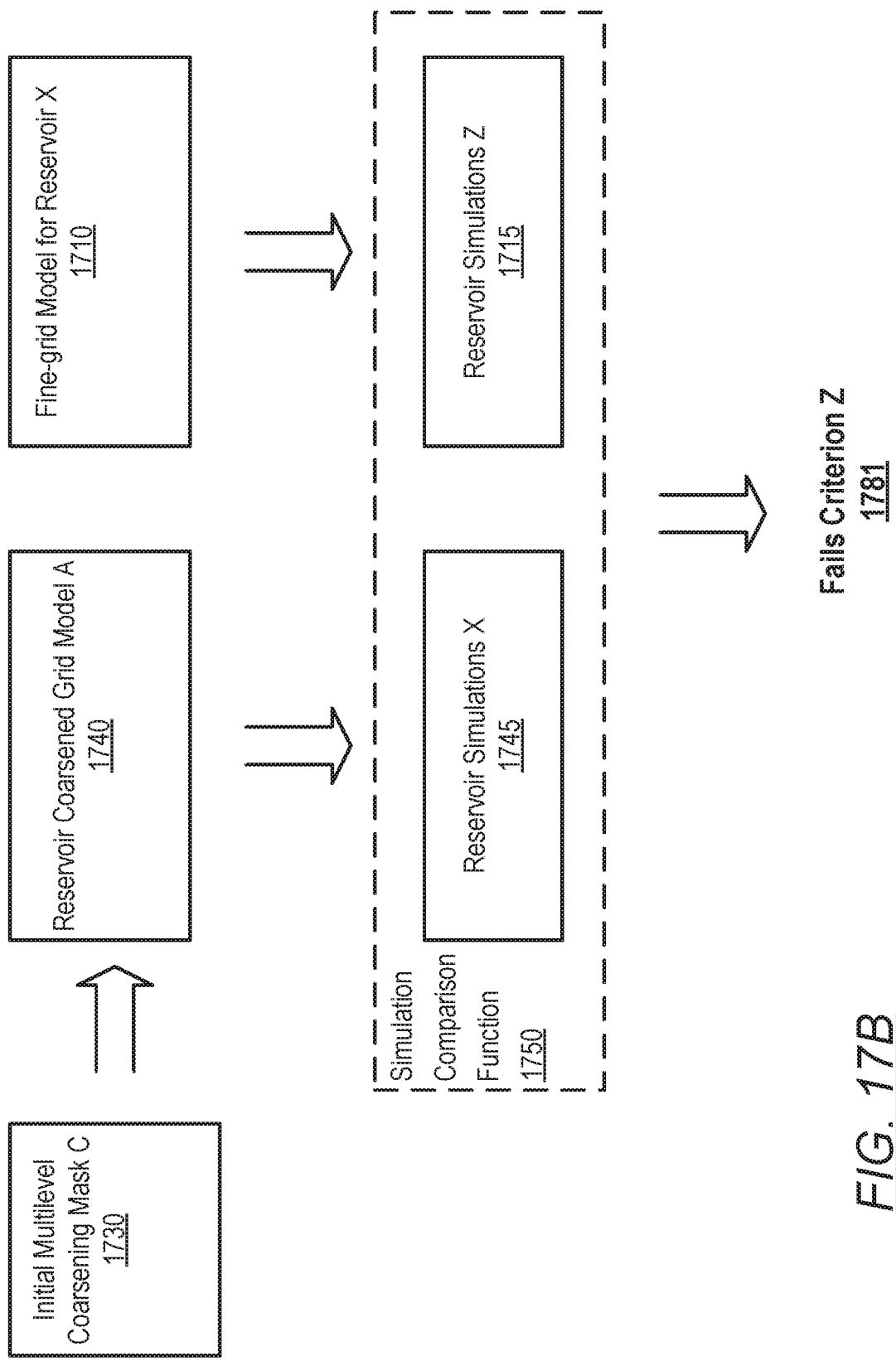
Figure 17C:
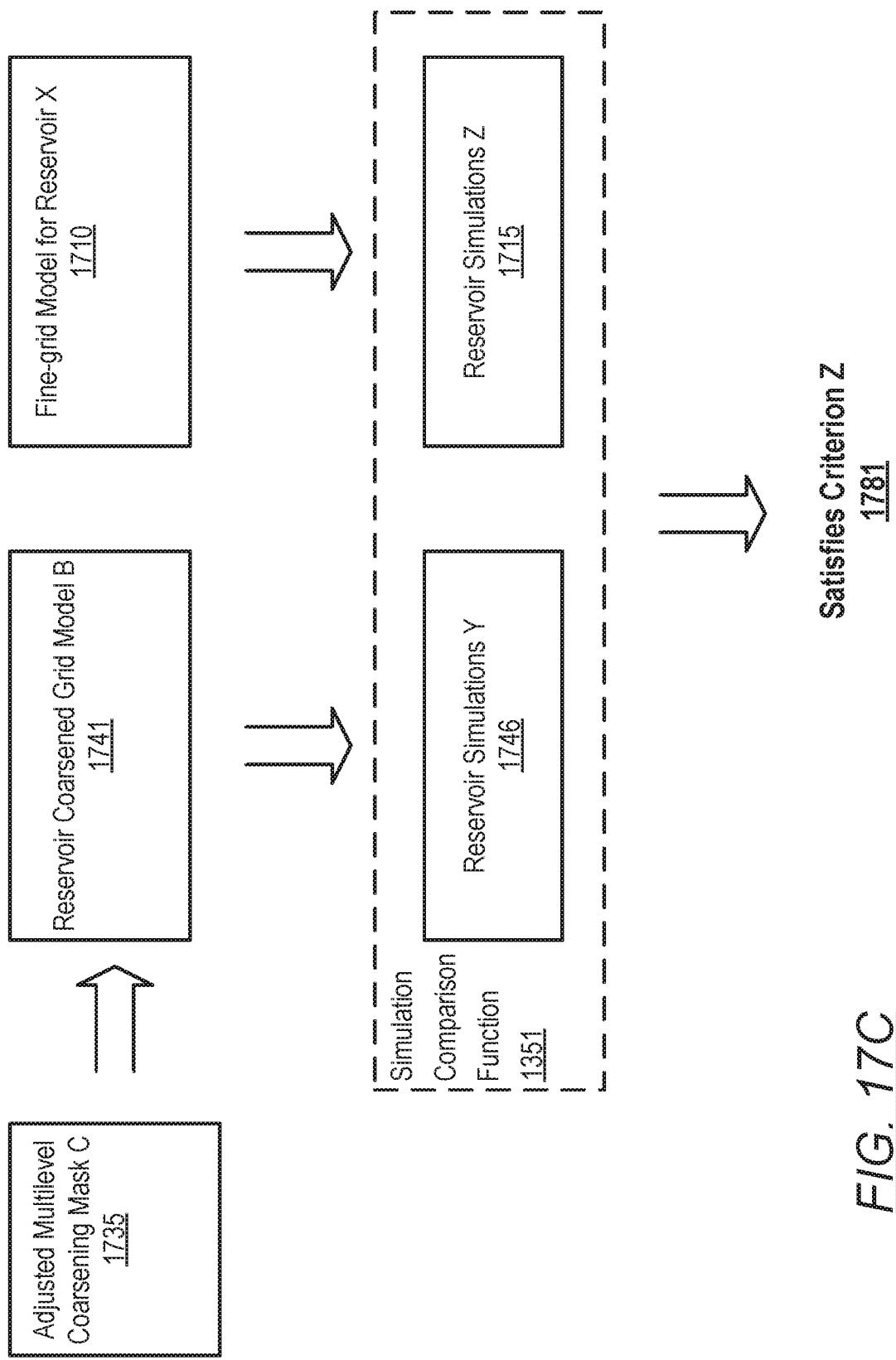

Turning to FIGS. 17A, 17B, and 17C, FIGS. 17A, 17B, and 17C provide an example of generating a coarsening grid model using flow property data in accordance with one or more embodiments. The following example is for explanatory purposes only and not intended to limit the scope of the disclosed technology.

In FIG. 17A, a reservoir simulator uses a streamline simulation function (1760) to obtain a flow property data file B (1720) from a fine-grid model (1710) for reservoir X. In particular, the streamline simulation function (1760) uses dynamic property data (1711) and static property data (1712) to map streamlines within reservoir X. Multiple streamline files are generated that represent different periods during the simulation, which may be combined into a single graph representing connectivity as a static property. Therefore, the files may be preprocessed to generate a single property file. One embodiment may use, for any given cell, the value representing the strongest connectivity at any given time (minimum TOF). This, however, can be experimented with, and the most optimal combination may be found. Thus, the output of various streamline simulations is a flow property data file B (1720) that includes time of flight data (1721). Next, the reservoir simulator applies a coarsening lookup function F (1770) to the time of flight data (1721) to generate an initial multilevel coarsening mask C (1730) that includes two coarsening levels, i.e., coarsening level A (1731) and coarsening level B (1732). From the initial multilevel coarsening mask C (1730), the reservoir simulator proceeds to generate a reservoir coarsened grid model A (1740) using model data from the fine-grid model (1710) for reservoir X. Afterwards, the reservoir coarsened grid model (1740) is used to generate reservoir simulations (e.g., reservoir simulations X (1745)).

In FIG. 17B, the initial multilevel coarsening mask C (1730) is verified based on the reservoir simulations X (1745). More specifically, a reservoir simulator (1750) uses a simulation comparison function (1750) to compare the reservoir simulations X (1745) with reservoir simulations (i.e., reservoir simulations Z (1715)) produce by the fine-grid model (1710) for reservoir X. However, based on results of the simulation comparison function (1750), the coarsened grid model A (1740) and thus the initial multilevel coarsening mask C (1730) fail to satisfy a criterion Z (1781).

In FIG. 17C, a reservoir simulator modifies the initial multilevel coarsening mask C (1730) to produce an adjusted multilevel coarsening mask C (1735). For example, the adjusted multilevel coarsening mask C (1735) may have different coarsening levels or arrangements of coarsened grid blocks than the initial multilevel coarsening mask C (1730). Another coarsened grid model (i.e., reservoir coarsened grid model B (1741) is generated using the adjusted multilevel coarsening mask C (1735). The reservoir simulator again uses the simulation comparison function (1750) on reservoir simulations (i.e., reservoir simulations Y (1746)) based on the reservoir coarsened grid model B (1741) and the reservoir simulations Z (1715) from the fine-grid model (1710). Here, the reservoir coarsened grid model B (1741) satisfies criterion Z (1781).

Computing System

Figure 18:
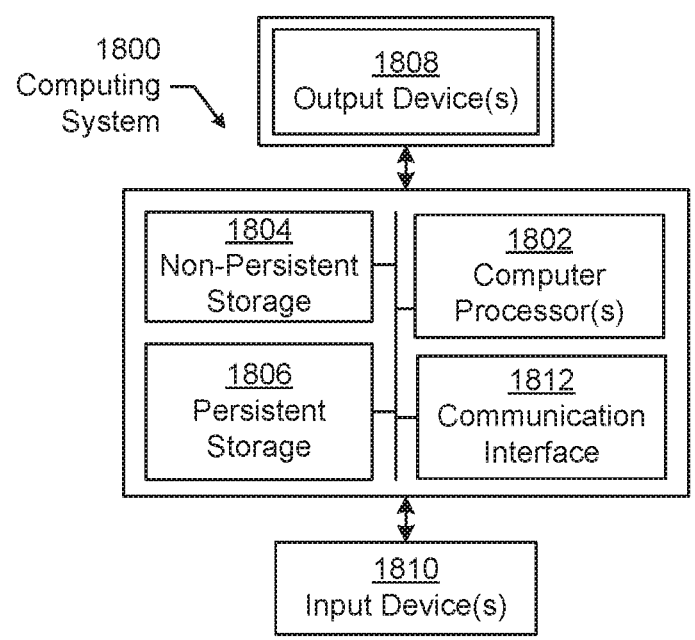
FIG. 18 shows a computing system in accordance with one or more embodiments.

Embodiments may be implemented on a computing system. Any combination of mobile, desktop, server, router, switch, embedded device, or other types of hardware may be used. For example, as shown in FIG. 18, the computing system (1800) may include one or more computer processors (1802), non-persistent storage (1804) (e.g., volatile memory, such as random access memory (RAM), cache memory), persistent storage (1806) (e.g., a hard disk, an optical drive such as a compact disk (CD) drive or digital versatile disk (DVD) drive, a flash memory, etc.), a communication interface (1812) (e.g., Bluetooth interface, infrared interface, network interface, optical interface, etc.), and numerous other elements and functionalities.

The computer processor(s) (1802) may be an integrated circuit for processing instructions. For example, the computer processor(s) may be one or more cores or micro-cores of a processor. The computing system (1800) may also include one or more input devices (1810), such as a touchscreen, keyboard, mouse, microphone, touchpad, electronic pen, or any other type of input device.

The communication interface (1812) may include an integrated circuit for connecting the computing system (1800) to a network (not shown) (e.g., a local area network (LAN), a wide area network (WAN) such as the Internet, mobile network, or any other type of network) and/or to another device, such as another computing device.

Further, the computing system (1800) may include one or more output devices (1808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1802), non-persistent storage (1804), and persistent storage (1806). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system or group of computing systems described in FIG. 18 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (1800) in FIG. 18. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 18, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 18 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 18 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 18. Other functions may be performed using one or more embodiments of the disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
performing, by a computer processor, a first reservoir simulation of a reservoir region of interest using a first grid model to produce a first plurality of streamlines;
obtaining, by the computer processor, model data for the reservoir region of interest;
generating, by the computer processor, a multilevel coarsening mask describing a plurality of coarsening levels that correspond to different flow values among flow property data based on the first plurality of streamlines;
generating, by the computer processor, a first coarsened grid model using the model data and the multilevel coarsening mask;
performing, by the computer processor, a second reservoir simulation of the reservoir region of interest using the first coarsened grid model to produce a second plurality of streamlines;
performing, by the computer processor, a comparison of the first plurality of streamlines with the second plurality of streamlines;
adjusting, by the computer processor, the multilevel coarsening mask based on the comparison to produce an updated multilevel coarsening mask;
updating, by the computer processor, the first coarsened grid model based on the model data and the updated multilevel coarsening mask to produce a second coarsened grid model; and
performing, by the computer processor, a third reservoir simulation of the reservoir region of interest using the second coarsened grid model.

2. The method of claim 1,
wherein the multilevel coarsening mask is determined using a lookup table describing a plurality of coarsening values based on predetermined ranges of flow rate property values, and
wherein the multilevel coarsening mask is an integer mask.

3. A method of claim 1,
wherein the multilevel coarsening mask is an adjusted property mask comprising a smoothed grid region, and
wherein the smoothed grid region is produced by performing an edge smoothing operation to an expanded grid region.

4. A method of claim 1,
wherein the first coarsened grid model is generated using a plurality of local grid refinement and coarsening (LGR) object statements that are determined using a decomposition algorithm and one or more binary masks.

5. A method of claim 1,
wherein the first coarsened grid model is based on a coarsening scenario generated using a combinatorial algorithm.

6. A computer system, comprising:
a processor; and
a memory coupled to the processor, the memory comprising instructions, when executed by the processor, are configured to perform a method comprising:
performing a first reservoir simulation of a reservoir region of interest using a first grid model to produce a first plurality of streamlines;
obtaining model data for the reservoir region of interest;

generating a multilevel coarsening mask describing a plurality of coarsening levels that correspond to different flow values among flow property data based on the first plurality of streamlines;

generating a first coarsened grid model using the model data and the multilevel coarsening mask;

performing a second reservoir simulation of the reservoir region of interest using the first coarsened grid model to produce a second plurality of streamlines;

performing a comparison of the first plurality of streamlines with the second plurality of streamlines;

adjusting the multilevel coarsening mask based on the comparison to produce an updated multilevel coarsening mask;

updating the first coarsened grid model based on the model data and the updated multilevel coarsening mask to produce a second coarsened grid model; and performing a third reservoir simulation of the reservoir region of interest using the second coarsened grid model.

7. The computer system of claim 6,
wherein the multilevel coarsening mask is determined using a lookup table describing a plurality of coarsening values based on predetermined ranges of flow rate property values, and wherein the multilevel coarsening mask is an integer mask.

8. The computer system of claim 6,
wherein the multilevel coarsening mask is an adjusted property mask comprising a smoothed grid region, and
wherein the smoothed grid region is produced by performing an edge smoothing operation to an expanded grid region.

9. A non-transitory computer readable medium storing instructions executable by a computer processor, the instructions being configured to perform a method comprising:

performing a first reservoir simulation of a reservoir region of interest using a first grid model to produce a first plurality of streamlines;

obtaining model data for the reservoir region of interest;

generating a multilevel coarsening mask describing a plurality of coarsening levels that correspond to different flow values among flow property data based on the first plurality of streamlines;

generating a first coarsened grid model using the model data and the multilevel coarsening mask;

performing a second reservoir simulation of the reservoir region of interest using the first coarsened grid model to produce a second plurality of streamlines;

performing a comparison of the first plurality of streamlines with the second plurality of streamlines;

adjusting the multilevel coarsening mask based on the comparison to produce an updated multilevel coarsening mask;

updating the first coarsened grid model based on the model data and the updated multilevel coarsening mask to produce a second coarsened grid model; and performing a third reservoir simulation of the reservoir region of interest using the second coarsened grid model.

10. The non-transitory computer readable medium of claim 9,
wherein the multilevel coarsening mask is an adjusted property mask comprising a smoothed grid region, and
wherein the smoothed grid region is produced by performing an edge smoothing operation to an expanded grid region.

11. The non-transitory computer readable medium of claim 9,
wherein the first coarsened grid model is generated using a plurality of local grid refinement and coarsening (LGR) object statements that are determined using a decomposition algorithm and one or more binary masks.

12. The non-transitory computer readable medium of claim 9,
wherein the first coarsened grid model is based on a coarsening scenario generated using a combinatorial algorithm.

* * * * *